(12) United States Patent
Sasaki et al.

(10) Patent No.: US 8,619,517 B1
(45) Date of Patent: Dec. 31, 2013

(54) THERMALLY-ASSISTED MAGNETIC RECORDING HEAD HAVING A PLASMON GENERATOR

(75) Inventors: Yoshitaka Sasaki, Santa Clara, CA (US); Hiroyuki Ito, Milpitas, CA (US); Shigeki Tanemura, Milpitas, CA (US); Kazuki Sato, Milpitas, CA (US); Hironori Araki, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 58 days.

(21) Appl. No.: 13/584,185

(22) Filed: Aug. 13, 2012

(51) Int. Cl.
*G11B 11/00* (2006.01)

(52) U.S. Cl.
USPC .................................. 369/13.33

(58) Field of Classification Search
USPC ........ 369/13.02, 13.13, 13.32, 13.33, 112.09, 369/112.14, 112.21; 360/59; 385/31, 385/88–94, 129; 29/603.07–603.27; 250/201.3, 201.5
See application file for complete search history.

(56) References Cited

U.S. PATENT DOCUMENTS

| | | | |
|---|---|---|---|
| 7,855,937 B2 * | 12/2010 | Shimazawa et al. | 369/13.33 |
| 7,911,882 B2 * | 3/2011 | Shimazawa et al. | 369/13.33 |
| 8,045,422 B2 * | 10/2011 | Komura et al. | 369/13.33 |
| 8,107,325 B2 * | 1/2012 | Komura et al. | 369/13.33 |
| 8,116,175 B2 * | 2/2012 | Chou et al. | 369/13.33 |
| 2007/0139818 A1 | 6/2007 | Shimazawa et al. | |
| 2010/0172220 A1 | 7/2010 | Komura et al. | |

\* cited by examiner

*Primary Examiner* — Brenda Bernardi
(74) *Attorney, Agent, or Firm* — Oliff & Berridge, PLC

(57) ABSTRACT

A thermally-assisted magnetic recording head includes a waveguide having a core and a cladding, and a plasmon generator. The core has an evanescent light generating surface. The plasmon generator has a plasmon exciting part opposed to the evanescent light generating surface. Assuming a virtual straight line that passes internally through the core and that is parallel to the direction of travel of light propagating through the core, at least part of the evanescent light generating surface and at least part of the plasmon exciting part are both inclined relative to the virtual straight line such that the distance from the virtual straight line decreases with increasing proximity to the medium facing surface.

6 Claims, 26 Drawing Sheets

THERMALLY-ASSISTED MAGNETIC RECORDING HEAD HAVING A PLASMON GENERATOR

BACKGROUND OF THE INVENTION

1. Field of the Invention

The present invention relates to a thermally-assisted magnetic recording head for use in thermally-assisted magnetic recording where a recording medium is irradiated with near-field light to lower the coercivity of the recording medium for data writing.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the thin-film magnetic head is mounted on a slider that flies slightly above the surface of a recording medium. The slider has a medium facing surface that faces the recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of a recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating the near-field light is typically guided through a waveguide, which is provided in the slider, to the plasmon generator disposed near the medium facing surface of the slider.

U.S. Patent Application Publication No. 2007/0139818 A1 discloses a thermally-assisted magnetic recording head configured to excite plasmons on a plasmon generator (a near-field-light generating layer) by directly irradiating the plasmon generator with laser light.

U.S. Patent Application Publication No. 2010/0172220 A1 discloses a thermally-assigned magnetic recording head in which a plasmon generator (a surface plasmon antenna) is arranged to face the outer surface of a waveguide (a core) with a predetermined distance therebetween, so that light propagating through the waveguide is totally reflected at the outer surface of the waveguide to thereby generate evanescent light that is used to excite surface plasmons on the plasmon generator.

The configuration in which the plasmon generator is directly irradiated with laser light to excite plasmons on the plasmon generator, such as one disclosed in U.S. Patent Application Publication No. 2007/0139818 A1, has a number of problems as follows. First, this configuration has the problem of low efficiency of transformation of laser light into near-field light because most part of the laser light is reflected at the surface of the plasmon generator or transformed into thermal energy and absorbed by the plasmon generator. Further, this configuration has the problem that the plasmon generator greatly increases in temperature when it absorbs thermal energy, and this may result in corrosion of the plasmon generator. Further, this configuration has the problem that the plasmon generator expands as it increases in temperature, and may thus protrude from the medium facing surface to cause damage to a recording medium or to itself.

The configuration in which evanescent light is used to excite surface plasmons on a plasmon generator, such as one disclosed in U.S. Patent Application Publication No. 2010/0172220 A1, provides higher efficiency of transformation of laser light into near-field light when compared with the case of directly irradiating the plasmon generator with laser light. This makes it possible to resolve the above-described problems.

In the thermally-assisted magnetic recording head disclosed in U.S. Patent Application No. 2010/0172220 A1, the evanescent-light-generating portion of the outer surface of the waveguide and a part of the outer surface of the plasmon generator that is opposed to the aforementioned portion are both arranged parallel to the direction of travel of the laser light propagating through the waveguide. This configuration allows only a small amount of the entire laser light propagating through the waveguide to reach the evanescent-light-generating portion of the outer surface of the waveguide. It is thus difficult with this configuration to generate much evanescent light and to thereby excite a lot of surface plasmons on the plasmon generator.

OBJECT AND SUMMARY OF THE INVENTION

It is an object of the present invention to provide a thermally-assisted magnetic recording head that is configured to excite surface plasmons on a plasmon generator by using evanescent light, and allows a lot of surface plasmons to be excited on the plasmon generator.

A thermally-assisted magnetic recording head of the present invention includes: a medium facing surface that faces a recording medium; a main pole; a waveguide; and a plasmon generator. The main pole has an end face located in the medium facing surface, and produces a write magnetic field for writing data on the recording medium. The waveguide includes a core through which light propagates, and a cladding that surrounds the core. The plasmon generator has a near-field light generating part located in the medium facing surface.

The core has an evanescent light generating surface that generates evanescent light based on the light propagating through the core. The plasmon generator has a plasmon exciting part that is opposed to the evanescent light generating surface with a predetermined distance therebetween. The cladding includes an interposer interposed between the evanescent light generating surface and the plasmon exciting part.

A virtual straight line is assumed for the thermally-assisted magnetic recording head of the present invention. The virtual straight line passes internally through the core and is parallel to the direction of travel of the light propagating through the core. At least part of the evanescent light generating surface and at least part of the plasmon exciting part are both inclined relative to the virtual straight line such that the distance from the virtual straight line decreases with increasing proximity to the medium facing surface.

In the thermally-assisted magnetic recording head of the present invention, the plasmon generator is configured so that a surface plasmon is excited on the plasmon exciting part through coupling with the evanescent light generated from the evanescent light generating surface, the surface plasmon propagates to the near-field light generating part, and the near-field light generating part generates near-field light based on the surface plasmon.

In the thermally-assisted magnetic recording head of the present invention, the at least part of the evanescent light generating surface and the at least part of the plasmon exciting part may each form an angle in the range of 10° to 35° or in the range of 10° to 20° relative to the virtual straight line.

In the thermally-assisted magnetic recording head of the present invention, the plasmon exciting part may be a surface. In this case, the plasmon exciting part may include a width changing portion. The width changing portion has a width in a direction parallel to the medium facing surface and the evanescent light generating surface, the width decreasing with increasing proximity to the medium facing surface.

In the thermally-assisted magnetic recording head of the present invention, the plasmon generator may be interposed between the core and the main pole.

In the thermally-assisted magnetic recording head of the present invention, at least part of the evanescent light generating surface of the core and at least part of the plasmon exciting part of the plasmon generator are both inclined relative to the aforementioned virtual straight line such that the distance from the virtual straight line decreases with increasing proximity to the medium facing surface. This allows a larger amount of the entire light propagating through the core to reach the evanescent light generating surface than in the case where the evanescent light generating surface and the plasmon exciting part are arranged parallel to the direction of travel of the light propagating through the core. Consequently, according to the present invention, it is possible to produce much evanescent light from the evanescent light generating surface and to thereby excite a lot of surface plasmons on the plasmon generator.

Other and further objects, features and advantages of the present invention will appear more fully from the following description.

DETAILED DESCRIPTION OF THE PREFERRED EMBODIMENTS

First Embodiment

Figure 1:
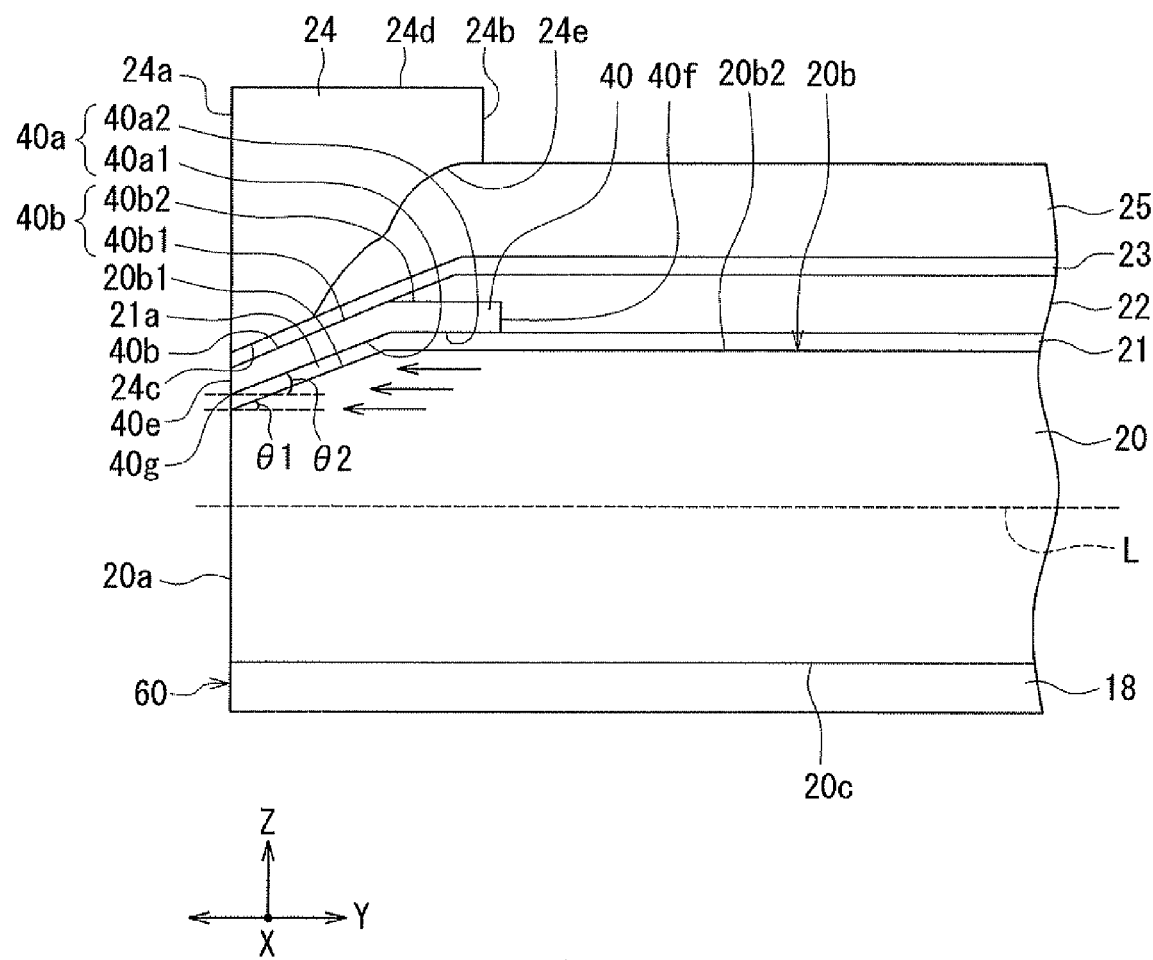
FIG. 1 is a cross-sectional view showing the main part of a thermally-assisted magnetic recording head according to a first embodiment of the invention.
Figure 2:
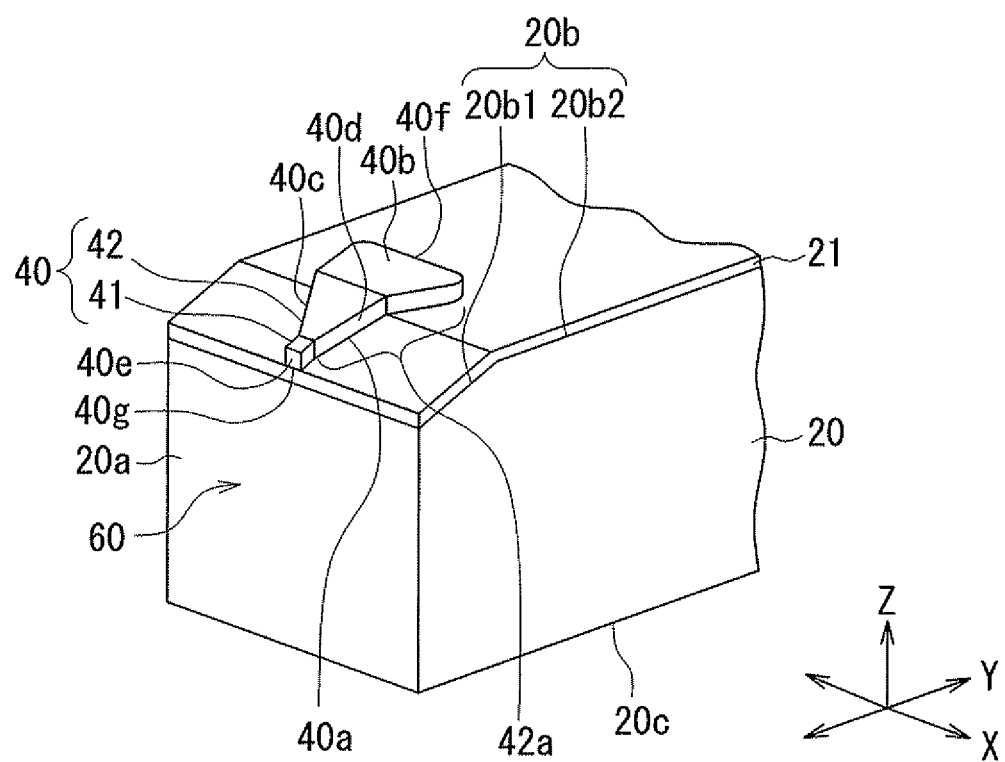
FIG. 2 is a perspective view showing the main part of the thermally-assisted magnetic recording head according to the first embodiment of the invention.
Figure 3:
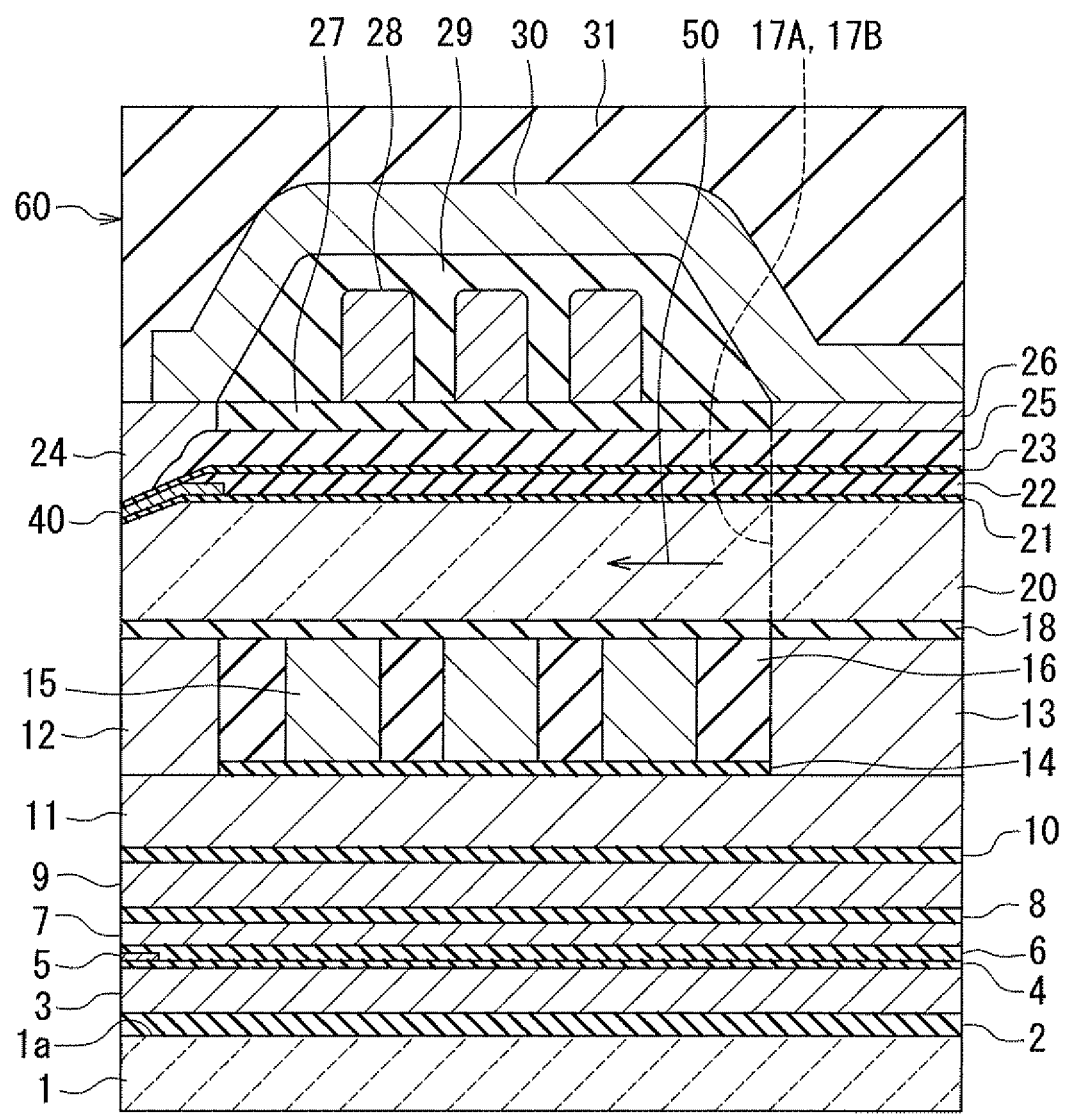
FIG. 3 is a cross-sectional view showing the configuration of the thermally-assisted magnetic recording head according to the first embodiment of the invention.
Figure 4:
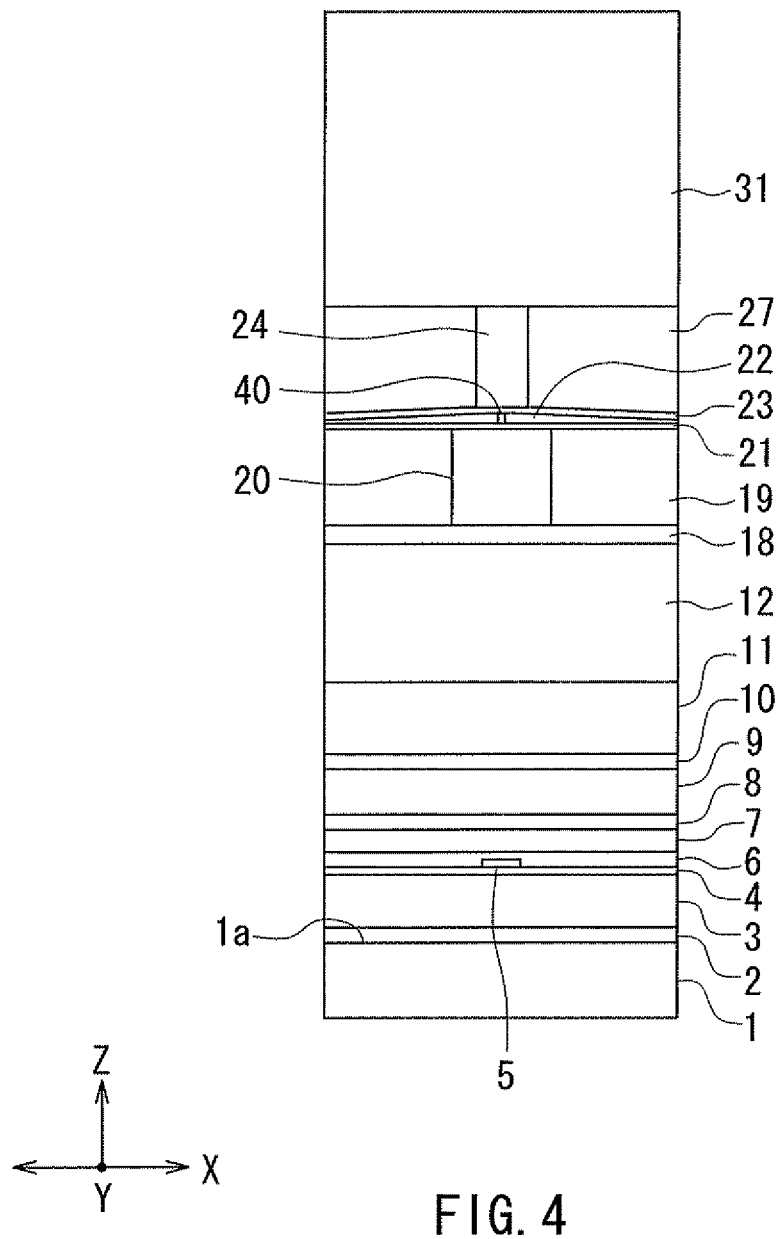
FIG. 4 is a front view showing the medium facing surface of the thermally-assisted magnetic recording head according to the first embodiment of the invention.
Figure 5:
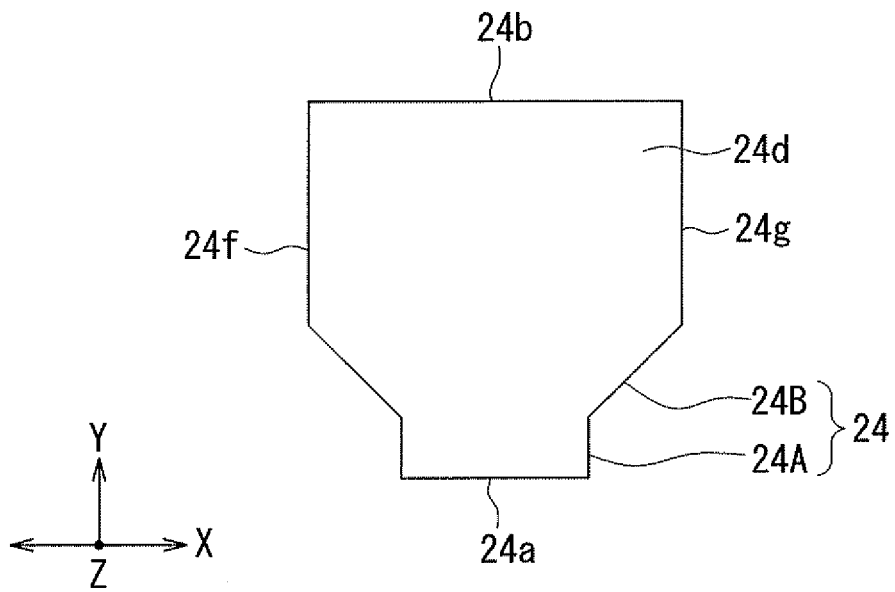
FIG. 5 is a plan view showing a first example of the main pole of the first embodiment of the invention.
Figure 6:
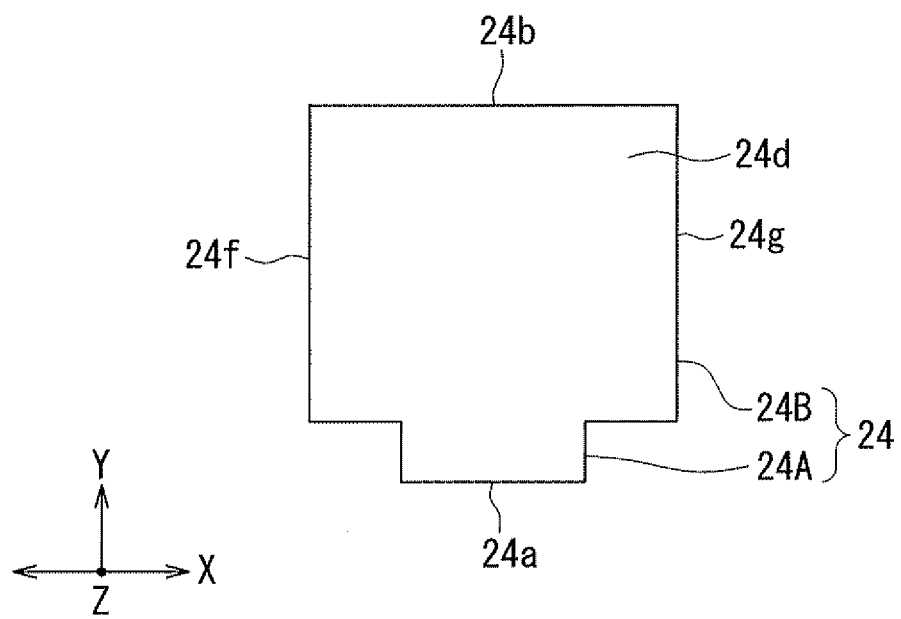
FIG. 6 is a plan view showing a second example of the main pole of the first embodiment of the invention.

Preferred embodiments of the present invention will now be described in detail with reference to the drawings. First, reference is made to FIG. 1 to FIG. 6 to describe the configuration of a thermally-assisted magnetic recording head according to a first embodiment of the invention. FIG. 1 is a cross-sectional view showing the main part of the thermally-assisted magnetic recording head. FIG. 2 is a perspective view showing the main part of the thermally-assisted magnetic recording head. FIG. 3 is a cross-sectional view showing the configuration of the thermally-assisted magnetic recording head. FIG. 4 is a front view showing the medium facing surface of the thermally-assisted magnetic recording head. FIG. 5 is a plan view showing a first example of the main pole. FIG. 6 is a plan view showing a second example of the main pole.

The thermally-assisted magnetic recording head according to the present embodiment is for use in perpendicular magnetic recording, and is in the form of a slider to fly over the surface of a recording medium that rotates. When the recording medium rotates, an airflow passing between the recording medium and the slider causes a lift to be exerted on the slider. The slider is configured to fly over the surface of the recording medium by means of the lift.

As shown in FIG. 3, the thermally-assisted magnetic recording head has a medium facing surface 60 that faces the recording medium. Here, X direction, Y direction, and Z direction will be defined as follows. The X direction is the direction across the tracks of the recording medium, i.e., the track width direction. The Y direction is a direction perpendicular to the medium facing surface 60. The Z direction is the direction of travel of the recording medium as viewed from the slider. The X, Y, and Z directions are orthogonal to one another.

As shown in FIG. 3 and FIG. 4, the thermally-assisted magnetic recording head includes: a substrate 1 made of a ceramic material such as aluminum oxide-titanium carbide ($Al_2O_3$—TiC) and having a top surface 1a; an insulating layer 2 made of an insulating material such as alumina ($Al_2O_3$) and disposed on the top surface 1a of the substrate 1; a bottom shield layer 3 made of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not shown) connected to the MR element 5; a top shield gap film 6 which is an insulating film disposed on the MR element 5; and a top shield layer 7 made of a magnetic material and disposed on the top shield gap film 6. The Z direction is also a direction perpendicular to the top surface 1a of the substrate 1.

An end of the MR element 5 is located in the medium facing surface 60 facing the recording medium. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the bottom shield layer 3 to the top shield layer 7 constitute a read head section. The thermally-assisted magnetic recording head further includes an insulating layer 8 disposed on the top shield layer 7, a middle shield layer 9 made of a magnetic material and disposed on the insulating layer 8, and a nonmagnetic layer 10 made of a nonmagnetic material and disposed on the middle shield layer 9. The insulating layer 8 and the nonmagnetic layer 10 are made of alumina, for example.

The thermally-assisted magnetic recording head further includes a return pole layer 11 made of a magnetic material and disposed on the nonmagnetic layer 10, and an insulating layer (not shown) disposed on the nonmagnetic layer 10 and surrounding the return pole layer 11. The return pole layer 11 has an end face located in the medium facing surface 60. The not-shown insulating layer is made of alumina, for example.

The thermally-assisted magnetic recording head further includes: a shield layer 12 disposed on a part of the return pole layer 11 in the vicinity of the medium facing surface 60; a coupling layer 13 disposed on another part of the return pole layer 11 away from the medium facing surface 60; an insulating layer 14 disposed on the remaining part of the return pole layer 11 and on the not-shown insulating layer; and a coil 15 disposed on the insulating layer 14. The shield layer 12 and the coupling layer 13 are each made of a magnetic material. The shield layer 12 has an end face located in the medium facing surface 60. The coil 15 is planar spiral-shaped and wound around the coupling layer 13. The coil 15 is made of a conductive material such as copper. The insulating layer 14 is made of alumina, for example.

The thermally-assisted magnetic recording head further includes an insulating layer 16 disposed around the shield layer 12, the coupling layer 13 and the coil 15 and in the space between every adjacent turns of the coil 15, and two coupling portions 17A and 17B disposed on the coupling layer 13. The coupling portions 17A and 17B are each made of a magnetic material. Each of the coupling portions 17A and 17B has a first layer located on the coupling layer 13, and a second and a third layer stacked in this order on the first layer. The first layer of the coupling portion 17A and the first layer of the coupling portion 17B are disposed to align in the track width direction (the X direction). The insulating layer 16 is made of alumina, for example.

The thermally-assisted magnetic recording head further includes a waveguide. The waveguide includes a core 20 through which light propagates, and a cladding that surrounds the core 20. The core 20 has an end face 20a that is closer to the medium facing surface 60, an evanescent light generating surface 20b serving as a top surface, a bottom surface 20c, and two side surfaces. The end face 20a may be located in the medium facing surface 60 or at a distance from the medium facing surface 60. FIG. 1 to FIG. 3 illustrate an example in which the end face 20a is located in the medium facing surface 60. The shape and location of the core 20 will be described in detail later.

The cladding includes cladding layers 18, 19, and 21. The cladding layer 18 is disposed over the shield layer 12, the coupling layer 13, the coil 15, and the insulating layer 16. The core 20 is disposed on the cladding layer 18. The cladding layer 19 is disposed on the cladding layer 18 and surrounds the core 20. The cladding layer 21 is disposed over the evanescent light generating surface 20b of the core 20 and the top surface of the cladding layer 19.

The core 20 is made of a dielectric material that transmits laser light to be used for generating near-field light. The laser light emitted from a laser diode (not shown) enters the core 20 and propagates through the core 20. The cladding layers 18, 19, and 21 are each made of a dielectric material that has a refractive index lower than that of the core 20. For example, the core 20 may be made of tantalum oxide such as $Ta_2O_5$ or silicon oxynitride (SiON), whereas the cladding layers 18, 19, and 21 may be made of silicon dioxide ($SiO_2$) or alumina.

The first layers of the coupling portions 17A and 17B are embedded in the cladding layer 18. The second layers of the coupling portions 17A and 17B are embedded in the cladding layer 19. The second layer of the coupling portion 17A and the second layer of the coupling portion 17B are located on opposite sides of the core 20 in the track width direction (the X direction) and are each spaced from the core 20.

The thermally-assisted magnetic recording head further includes a main pole 24 disposed above the core 20 in the vicinity of the medium facing surface 60, and a plasmon generator 40 interposed between the core 20 and the main pole 24. The plasmon generator 40 is configured to excite surface plasmons on the principle to be described later. The plasmon generator 40 is made of, for example, one of Au, Ag, Al, Cu, Pd, Pt, Rh and Ir, or an alloy composed of two or more of these elements. The shapes and locations of the main pole 24 and the plasmon generator 40 will be described in detail later.

The thermally-assisted magnetic recording head further includes a dielectric layer 22 disposed on the cladding layer 21 and surrounding the plasmon generator 40, a dielectric layer 23 disposed to cover the plasmon generator 40 and the dielectric layer 22, and a dielectric layer 25 disposed on the dielectric layer 23 at a position away from the medium facing surface 60. The main pole 24 is disposed over the dielectric layers 23 and 25. The third layers of the coupling portions 17A and 17B are embedded in the cladding layer 21 and the dielectric layers 22, 23, and 25. The dielectric layer 22 may be made of $SiO_2$ or alumina, for example. The dielectric layers 23 and 25 may be made of alumina, for example.

The thermally-assisted magnetic recording head further includes a coupling layer 26 made of a magnetic material and disposed over the third layers of the coupling portions 17A and 17B and the dielectric layer 25, and a dielectric layer 27 disposed around the main pole 24 and the coupling layer 26. The top surfaces of the main pole 24, the coupling layer 26, and the dielectric layer 27 are even with each other. The dielectric layer 27 is made of alumina, for example.

The thermally-assisted magnetic recording head further includes a coil 28 disposed on the dielectric layer 27, an insulating layer 29 disposed to cover the coil 28, and a yoke layer 30 made of a magnetic material and disposed over the main pole 24, the coupling layer 26 and the insulating layer 29. The yoke layer 30 magnetically couples the main pole 24 and the coupling layer 26 to each other. The coil 28 is planar spiral-shaped and wound around part of the yoke layer 30 lying on the coupling layer 26. The coil 28 is made of a conductive material such as copper. The insulating layer 29 is made of alumina, for example.

The thermally-assisted magnetic recording head further includes a protective layer 31 disposed to cover the yoke layer 30. The protective layer 31 is made of alumina, for example.

The parts from the return pole layer 11 to the yoke layer 30 constitute a write head section. The coils 15 and 28 produce magnetic fields corresponding to data to be written on a recording medium. The shield layer 12, the return pole layer 11, the coupling layer 13, the coupling portions 17A and 17B, the coupling layer 26, the yoke layer 30, and the main pole 24 form a magnetic path for passing magnetic fluxes corresponding to the magnetic fields produced by the coils 15 and 28. The coils 15 and 28 are connected in series or in parallel so that the magnetic flux corresponding to the magnetic field produced by the coil 15 and the magnetic flux corresponding to the magnetic field produced by the coil 28 flow in the same direction through the main pole 24. The main pole 24 allows the magnetic flux corresponding to the magnetic field produced by the coil 15 and the magnetic flux corresponding to the magnetic field produced by the coil 28 to pass, and produces a write magnetic field for writing data on the recording medium by means of a perpendicular magnetic recording system.

As has been described, the thermally-assisted magnetic recording head according to the present embodiment includes the medium facing surface 60, the read head section, and the write head section. The medium facing surface 60 faces a recording medium. The read head section and the write head section are stacked on the substrate 1. The write head section is located on the front side in the direction of travel of the recording medium (the Z direction) (i.e., located on the trailing side) relative to the read head section.

The write head section includes the coils 15 and 28, the main pole 24, the waveguide, and the plasmon generator 40. The waveguide includes the core 20 and the cladding. The cladding includes the cladding layers 18, 19, and 21. The main pole 24 is located on the front side in the direction of travel of the recording medium (the Z direction) relative to the core 20. The core 20 has the evanescent light generating surface 20b. The plasmon generator 40 is disposed above the evanescent light generating surface 20b of the core 20 and interposed between the core 20 and the main pole 24.

The shapes and locations of the core 20 and the plasmon generator 40 will now be described in detail with reference to FIG. 1 and FIG. 2. As shown in FIG. 1 and FIG. 2, the evanescent light generating surface 20b of the core 20 includes an inclined portion 20b1 and a horizontal portion 20b2, the inclined portion 20b1 being closer to the medium facing surface 60. The inclined portion 20b1 has a front end portion closer to the medium facing surface 60 and a rear end portion opposite to the front end portion. The front end portion of the inclined portion 20b1 may be located in the medium facing surface 60 or at a distance from the medium facing surface 60. FIG. 1 and FIG. 2 illustrate an example in which the front end portion of the inclined portion 20b1 is located in the medium facing surface 60. The horizontal portion 20b2 is connected to the rear end portion of the inclined portion 20b1.

As shown in FIG. 1 and FIG. 2, the plasmon generator 40 has a plasmon exciting part 40a serving as a bottom surface, a top surface 40b, two side surfaces 40c and 40d, a front end face 40e, and a rear end face 40f. The front end face 40e is located in the medium facing surface 60 and couples the plasmon exciting part 40a, the top surface 40b, and the two side surfaces 40c and 40d to each other. The plasmon exciting part 40a is opposed to the evanescent light generating surface 20b of the core 20 with a predetermined distance therebetween. The cladding layer 21 includes an interposer 21a interposed between the evanescent light generating surface 20b and the plasmon exciting part 40a. Since the cladding layer 21 is part of the cladding, the cladding can be said to include the interposer 21a. The plasmon generator 40 is rectangular, for example, in cross section parallel to the medium facing surface 60.

In the present embodiment, the plasmon exciting part 40a is a surface. The plasmon exciting part 40a includes an inclined portion 40a1 and a horizontal portion 40a2, the inclined portion 40a1 being closer to the medium facing surface 60. The inclined portion 40a1 is opposed to the inclined portion 20b1 of the evanescent light generating surface 20b, and has a front end portion located in the medium facing surface 60 and a rear end portion opposite to the front end portion. The horizontal portion 40a2 is opposed to the horizontal portion 20b2 of the evanescent light generating surface 20b, and is connected to the rear end portion of the inclined portion 40a1. The front end face 40e has a near-field light generating part 40g located at the front extremity of the inclined portion 40a1. The near-field light generating part 40g generates near-field light on the principle to be described later.

Here, assume a virtual straight line that passes internally through the core 20 and is parallel to the direction of travel of laser light propagating through the core 20. In FIG. 3, the arrow with the reference numeral 50 indicates the direction of travel of the laser light. In FIG. 1, the broken line with the reference letter L represents the aforementioned virtual straight line. The virtual straight line L intersects the end face 20a of the core 20. The inclined portion 20b1, which is part of the evanescent light generating surface 20b, and the inclined portion 40a1, which is part of the plasmon exciting part 40a, are both inclined relative to the virtual straight line L such that the distance from the virtual straight line L decreases with increasing proximity to the medium facing surface 60. In other words, the inclined portions 20b1 and 40a1 are inclined such that their respective front end portions are located on the rear side in the direction of travel of the recording medium (the Z direction) relative to their respective rear end portions.

As shown in FIG. 1, the angle that the inclined portion 20b1 of the evanescent light generating surface 20b forms relative to the virtual straight line L will be represented by the symbol θ1, and the angle that the inclined portion 40a1 of the plasmon exciting part 40a forms relative to the virtual straight line L will be represented by the symbol θ2. The angles θ1 and θ2 are preferably in the range of 10° to 35°, and more preferably in the range of 10° to 20°. The reason for this will be described in detail later.

The horizontal portion 20b2 of the evanescent light generating surface 20b and the horizontal portion 40a2 of the plasmon exciting part 40a both extend substantially perpendicularly to the medium facing surface 60.

The top surface 40b of the plasmon generator 40 includes an inclined portion 40b1 and a horizontal portion 40b2, the inclined portion 40b1 being closer to the medium facing surface 60. The inclined portion 40b1 has a front end portion located in the medium facing surface 60 and a rear end portion opposite to the front end portion. The horizontal portion 40b2 is connected to the rear end portion of the inclined portion 40b1. In the present embodiment, in particular, the inclined portion 40b1 and the horizontal portion 40b2 are roughly parallel to the inclined portion 40a1 and the horizontal portion 40a2 of the plasmon exciting part 40a, respectively. The plasmon generator 40 has a thickness (dimension in the Z direction) that is generally constant regardless of the distance from the medium facing surface 60.

As shown in FIG. 2, the plasmon generator 40 includes a narrow portion 41 that is located in the vicinity of the medium facing surface 60 and a wide portion 42 that is located farther from the medium facing surface 60 than is the narrow portion 41. The narrow portion 41 has a bottom surface facing the evanescent light generating surface 20b of the core 20, a top surface, two side surfaces, and a front end face that couples the bottom surface, the top surface and the two side surfaces to each other. The front end face of the narrow portion 41 also serves as the front end face 40e of the plasmon generator 40. The width of the narrow portion 41 in the direction parallel to the medium facing surface 60 and the evanescent light generating surface 20b (the X direction) may be constant regardless of the distance from the medium facing surface 60 or may decrease with increasing proximity to the medium facing surface 60.

The wide portion 42 is located on a side of the narrow portion 41 opposite to the front end face 40e and is coupled to the narrow portion 41. The width of the wide portion 42 in the track width direction (the X direction) is the same as that of the narrow portion 41 at the boundary between the narrow portion 41 and the wide portion 42, and is greater than that of the narrow portion 41 in the other positions. The wide portion 42 has a bottom surface facing the evanescent light generating surface 20b of the core 20, a top surface, two side surfaces, and a rear end face that couples the bottom surface, the top surface and the two side surfaces to each other.

The plasmon exciting part 40a is composed of the bottom surface of the narrow portion 41 and the bottom surface of the wide portion 42. The boundary between the bottom surface of the narrow portion 41 and the bottom surface of the wide portion 42 is located in the inclined portion 40a1. Thus, the inclined portion 40a1 is composed of the bottom surface of the narrow portion 41 and a part of the bottom surface of the wide portion 42, and the horizontal portion 40a2 is composed of the remaining part of the bottom surface of the wide portion 42.

The plasmon exciting part 40a includes a width changing portion 42a. In the present embodiment, the width changing portion 42a is particularly a portion of the plasmon exciting part 40a that is composed of the bottom surface of the wide portion 42. The width changing portion 42a has a width in the direction parallel to the medium facing surface 60 and the evanescent light generating surface 20b (the X direction). This width of the width changing portion 42a decreases with increasing proximity to the front end face 40e, i.e., with increasing proximity to the medium facing surface 60, and becomes equal to the width of the bottom surface of the narrow portion 41 at the boundary between the width changing portion 42a and the narrow portion 41.

The width (the dimension in the track width direction (the X direction)) of the front end face 40e is defined by the width of the narrow portion 41 in the medium facing surface 60. The width of the front end face 40e falls within the range of 5 to 40 nm, for example. The height (the dimension in the Z direction) of the front end face 40e is defined by the height of the narrow portion 41 in the medium facing surface 60. The height of the front end face 40e falls within the range of 5 to 40 nm, for example.

The shape and location of the main pole 24 will now be described in detail with reference to FIG. 1 and FIG. 3 to FIG. 6. As shown in FIG. 1, FIG. 5 and FIG. 6, the main pole 24 has a front end face 24a located in the medium facing surface 60, a rear end face 24b opposite to the front end face 24a, a bottom surface 24c, a top surface 24d, a connecting surface 24e, and two side surfaces 24f and 24g. The connecting surface 24e connects the rear end face 24b and the bottom surface 24c to each other. Further, as shown in FIG. 5 and FIG. 6, the main pole 24 includes a narrow portion 24A and a wide portion 24B. The narrow portion 24A has an end face located in the medium facing surface 60 and an end portion opposite to the end face. The wide portion 24B is connected to the end portion of the narrow portion 24A. The wide portion 24B is greater than the narrow portion 24A in width in the track width direction (the X direction).

The width of the narrow portion 24A in the track width direction (the X direction) is generally constant regardless of the distance from the medium facing surface 60. FIG. 5 shows a first example of the main pole 24 in which the width of the wide portion 24B in the track width direction (the X direction) is the same as that of the narrow portion 24A at the boundary between the narrow portion 24A and the wide portion 24B, and gradually increases with increasing distance from the medium facing surface 60, then becoming constant. FIG. 6 shows a second example of the main pole 24 in which the width of the wide portion 24B in the track width direction (the X direction) is generally constant regardless of the distance from the medium facing surface 60. The narrow portion 24A has a length in the range of, for example, 0 to 0.3 μm in the direction perpendicular to the medium facing surface 60. Where the length is 0, there is no narrow portion 24A and thus the wide portion 24B has an end face located in the medium facing surface 60.

The distance from the top surface 1a of the substrate 1 to an arbitrary point on each of the bottom surface 24c and the connecting surface 24e of the main pole 24 increases with increasing distance from the arbitrary point to the medium facing surface 60. The bottom surface 24c of the main pole 24 is opposed to part of the top surface 40b of the plasmon generator 40 with the dielectric layer 23 interposed therebetween.

The distance between the connecting surface 24e of the main pole 24 and the evanescent light generating surface 20b of the core 20 increases with increasing distance from the medium facing surface 60. This makes it possible to prevent the light propagating through the core 20 from being absorbed in part by the main pole 24 and to prevent the surface plasmons excited on the plasmon exciting part 40a from being absorbed in part by the main pole 24.

Now, the principle of generation of near-field light in the present embodiment and the principle of thermally-assisted magnetic recording using the near-field light will be described in detail. Laser light emitted from a laser diode (not shown) enters the core 20. As shown in FIG. 3, the laser light 50 propagates through the core 20 toward the medium facing surface 60, and reaches the vicinity of the plasmon generator 40. In the core 20, the laser light 50 is totally reflected at the evanescent light generating surface 20b to generate evanescent light permeating into the interposer 21a. In the plasmon generator 40, surface plasmons are excited on the plasmon exciting part 40a through coupling with the aforementioned evanescent light. The surface plasmons propagate to the near-field light generating part 40g, and the near-field light generating part 40g generates near-field light based on the surface plasmons.

The near-field light generated from the near-field light generating part 40g is projected toward a recording medium, reaches the surface of the recording medium and heats a part of the magnetic recording layer of the recording medium. This lowers the coercivity of the part of the magnetic recording layer. In thermally-assisted magnetic recording, the part of the magnetic recording layer with the lowered coercivity is subjected to a write magnetic field produced by the main pole 24 for data writing.

The effects of the thermally-assisted magnetic recording head according to the present embodiment will now be described. In the present embodiment, the inclined portion 20b1, which is part of the evanescent light generating surface 20b of the core 20, and the inclined portion 40a1, which is part of the plasmon exciting part 40a of the plasmon generator 40, are both inclined relative to the virtual straight line L such that the distance from the virtual straight line L decreases with increasing proximity to the medium facing surface 60. This allows a larger amount of the laser light 50 propagating through the core 20 to reach the evanescent light generating surface 20b than in the case where the evanescent light generating surface 20b includes only the horizontal portion 20b2 and the plasmon exciting part 40a includes only the horizontal portion 40a2, that is, the case where the entire evanescent light generating surface 20b and the entire plasmon exciting part 40a are arranged parallel to the direction of travel of the laser light 50 propagating through the core 20. In FIG. 1, the arrows drawn within the core 20 indicate the laser light reaching the inclined portion 20b1 of the evanescent light generating surface 20b. Consequently, according to the present embodiment, it is possible to produce much evanescent light from the evanescent light generating surface 20b and to thereby excite a lot of surface plasmons on the plasmon generator 40.

In order for the above-described effects to be exerted noticeably, each of the angles θ1 and θ2 needs to be of a certain magnitude, and more specifically, should preferably be 10° or more. On the other hand, if the angles θ1 and θ2 are excessively great, the laser light 50 cannot be totally reflected at the inclined portion 20b1, so that part of the laser light 50 will pass through the interposer 21a to directly reach the inclined portion 40a1. In this case, there will occur the various problems associated with the configuration in which the plasmon generator is directly irradiated with laser light to excite plasmons on the plasmon generator. To avoid this, the angles θ1 and θ2 should preferably be 35° or less, and more preferably, be 20° or less. In view of the foregoing, the angles θ1 and θ2 should preferably be in the range of 10° to 35°, and more preferably in the range of 10° to 20°.

In the present embodiment, the plasmon exciting part 40a is a surface. This allows a lot of surface plasmons to be excited on the plasmon exciting part 40a. Further, the plasmon exciting part 40a includes the width changing portion 42a. This allows surface plasmons excited on the plasmon exciting part 40a to be concentrated as they propagate to the near-field light generating part 40g. Consequently, according to the present embodiment, it is possible to produce near-field light that has a small spot diameter and sufficient intensity.

Now, a method of manufacturing the thermally-assisted magnetic recording head according to the present embodiment will be described. The method of manufacturing the thermally-assisted magnetic recording head according to the present embodiment includes the steps of: forming components of a plurality of thermally-assisted magnetic recording heads, except the substrates 1, on a substrate that includes portions to become the substrates 1 of the plurality of thermally-assisted magnetic recording heads, thereby fabricating a substructure including a plurality pre-head portions aligned in a plurality of rows, the plurality of pre-head portions being intended to become individual thermally-assisted magnetic recording heads later; and forming the plurality of thermally-assisted magnetic recording heads by cutting the substructure to separate the plurality of pre-head portions from each other. In the step of forming the plurality of thermally-assisted magnetic recording heads, the cut surfaces are polished into the medium facing surfaces 60.

The method of manufacturing the thermally-assisted magnetic recording head according to the present embodiment will now be described in more detail with attention focused on a single thermally-assisted magnetic recording head. The method of manufacturing the thermally-assisted magnetic recording head forms the insulating layer 2, the bottom shield layer 3, and the bottom shield gap film 4 in this order on the substrate 1 first. Next, the MR element 5 and two leads (not shown) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

Reference is now made to FIG. 7A through FIG. 15B to describe the process of forming the yoke layer 30 after the formation of the nonmagnetic layer 10. FIG. 7A through FIG. 15B each show a stack of layers formed in the process of manufacturing the thermally-assisted magnetic recording head. Note that portions located below the return pole layer 11 are omitted from FIG. 7A through FIG. 15B. FIG. 7A to FIG. 15A each show a cross section that intersects the front end face 24a of the main pole 24 and that is perpendicular to the medium facing surface 60 and the top surface 1a of the substrate 1. FIG. 7B to FIG. 15B each show a cross section of the stack taken in the position at which the medium facing surface 60 is to be formed.

Figure 7A:
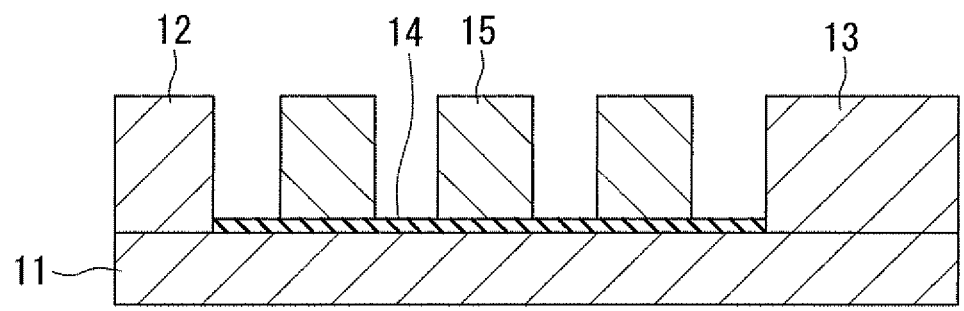
FIG. 7A and FIG. 7B are cross-sectional views showing a step of a method of manufacturing the thermally-assisted magnetic recording head according to the first embodiment of the invention.
Figure 7B:
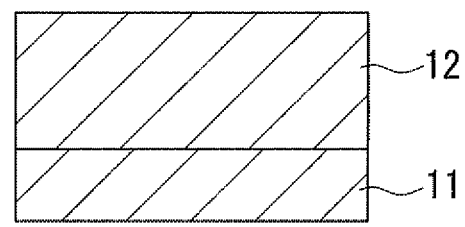

FIG. 7A and FIG. 7B show a step that follows the formation of the nonmagnetic layer 10. In this step, first, the return pole layer 11 is formed on the nonmagnetic layer 10. Next, an insulating layer (not shown) is formed to cover the return pole layer 11. The not-shown insulating layer is then polished by, for example, chemical mechanical polishing (hereinafter referred to as CMP), until the return pole layer 11 is exposed. Next, the insulating layer 14 is formed over the return pole layer 11 and the not-shown insulating layer. The insulating layer 14 is then selectively etched to form therein two openings for exposing the top surface of the return pole layer 11. In the positions of these two openings, the shield layer 12 and the coupling layer 13 are then formed on the return pole layer 11. Next, the coil 15 is formed on the insulating layer 14.

Figure 8A:
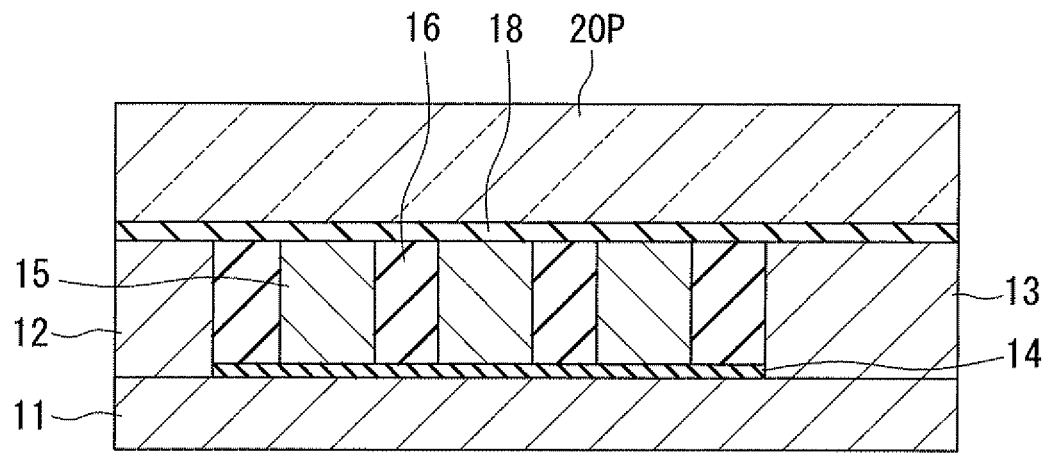
FIG. 8A and FIG. 8B are cross-sectional views showing a step that follows the step shown in FIG. 7A and FIG. 7B.
Figure 8B:
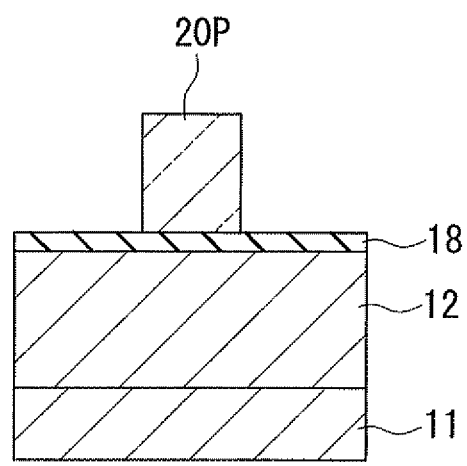

FIG. 8A and FIG. 8B show the next step. In this step, first, the insulating layer 16 is formed over the entire top surface of the stack. The insulating layer 16 is then polished by, for example, CMP, until the shield layer 12, the coupling layer 13 and the coil 15 are exposed. Next, although not shown, the first layers of the coupling portions 17A and 17B are formed on the coupling layer 13. Then, the cladding layer 18 is formed over the entire top surface of the stack. The cladding layer 18 is then polished by, for example, CMP, until the first layers of the coupling portions 17A and 17B are exposed.

Next, a dielectric layer 20P, which is to later become the core 20, is formed over the entire top surface of the stack. The dielectric layer 20P is then partially etched by, for example, reactive ion etching (hereinafter referred to as RIE), and thereby patterned. The planar shape (the shape as viewed from above) of the dielectric layer 20P patterned is the same as that of the core 20. Next, although not shown, the second layers of the coupling portions 17A and 17B are formed on the first layers of the coupling portions 17A and 17B.

Figure 9A:
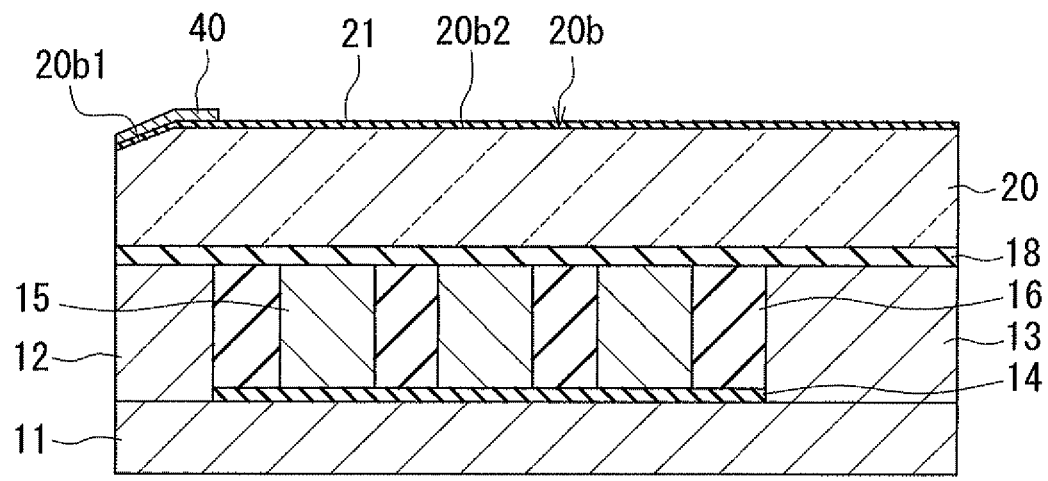
FIG. 9A and FIG. 9B are cross-sectional views showing a step that follows the step shown in FIG. 8A and FIG. 8B.
Figure 9A:
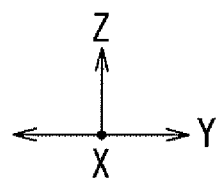
Figure 9B:
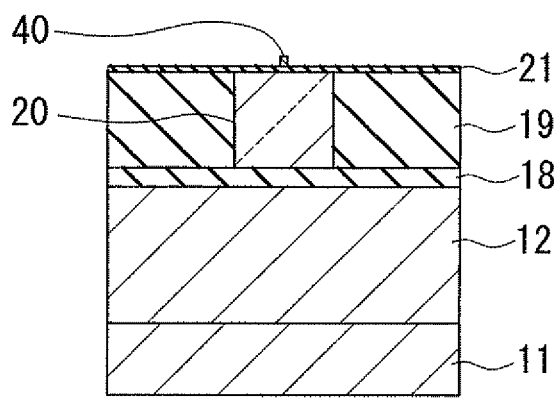
Figure 9B:
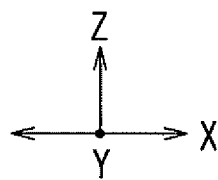

FIG. 9A and FIG. 9B show the next step. In this step, first, the cladding layer 19 is formed over the entire top surface of the stack. The cladding layer 19 is then polished by, for example, CMP, until the dielectric layer 20P and the second layers of the coupling portions 17A and 17B are exposed. Then, portions of the dielectric layer 20P and the cladding layer 19 are taper-etched by, for example, RIE or ion beam etching (hereinafter referred to as IBE), so that the dielectric layer 20P is provided with the inclined portion 20b1. A portion of the top surface of the dielectric layer 20P that remains unetched makes the horizontal portion 20b2. The dielectric layer 20P is thereby made into the core 20. Next, the cladding layer 21 is formed over the entire top surface of the stack. The plasmon generator 40 is then formed on the cladding layer 21. The plasmon generator 40 is formed by, for example, forming a metal film on the cladding layer 21 and then patterning the metal film by etching a part thereof.

Figure 10A:
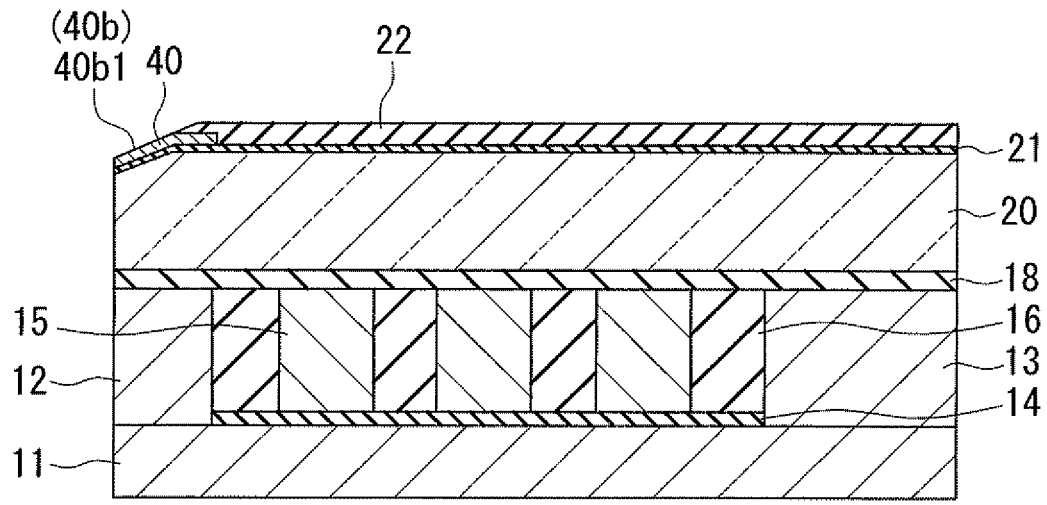
FIG. 10A and FIG. 10B are cross-sectional views showing a step that follows the step shown in FIG. 9A and FIG. 9B.
Figure 10A:
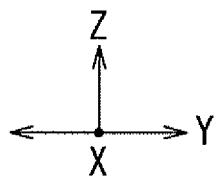
Figure 10B:
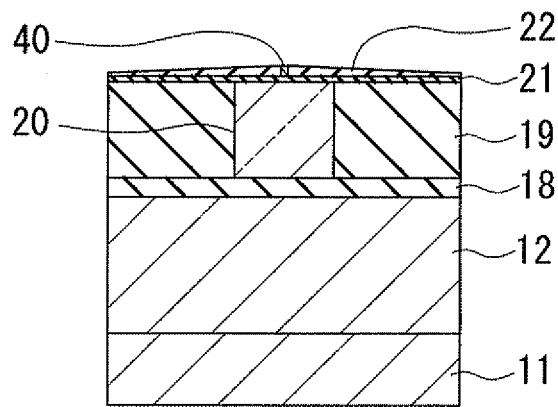
Figure 10B:
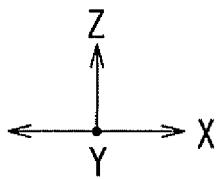
Figure 11A:
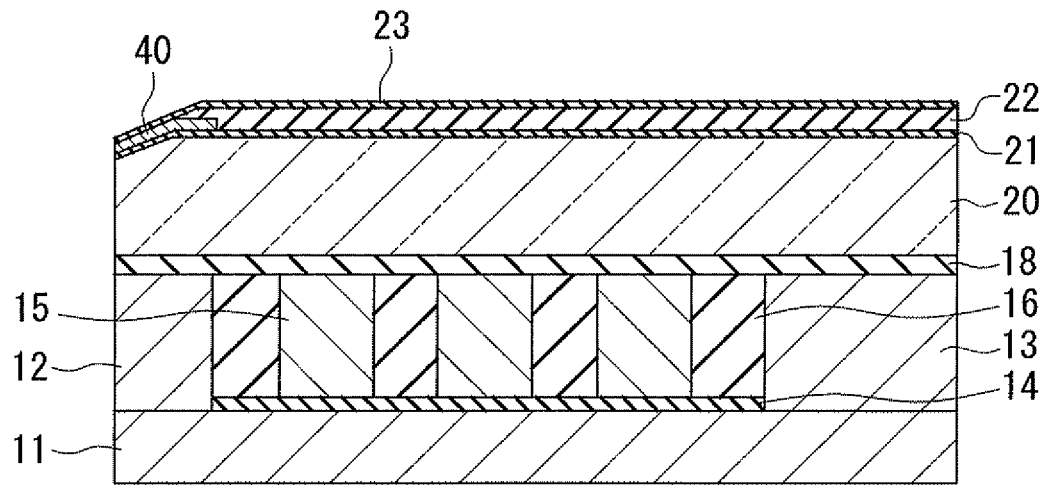
FIG. 11A and FIG. 11B are cross-sectional views showing a step that follows the step shown in FIG. 10A and FIG. 10B.
Figure 11B:
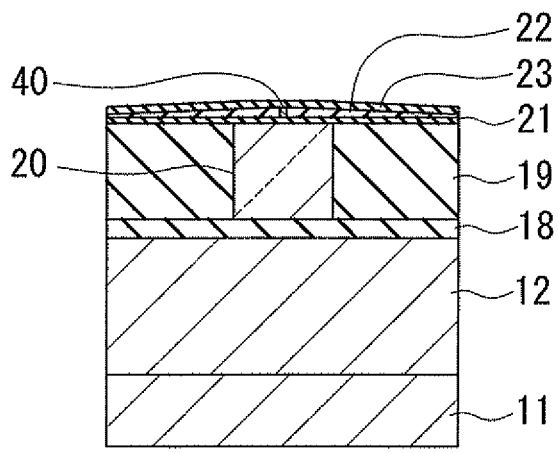

FIG. 10A and FIG. 10B show the next step. In this step, first, the dielectric layer 22 is formed over the entire top surface of the stack. The dielectric layer 22 is then etched in part by, for example, IBE, so as to expose the inclined portion 40b1 of the top surface 40b of the plasmon generator 40. Next, the dielectric layer 23 is formed over the entire top surface of the stack as shown in FIG. 11A and FIG. 11B.

Figure 12A:
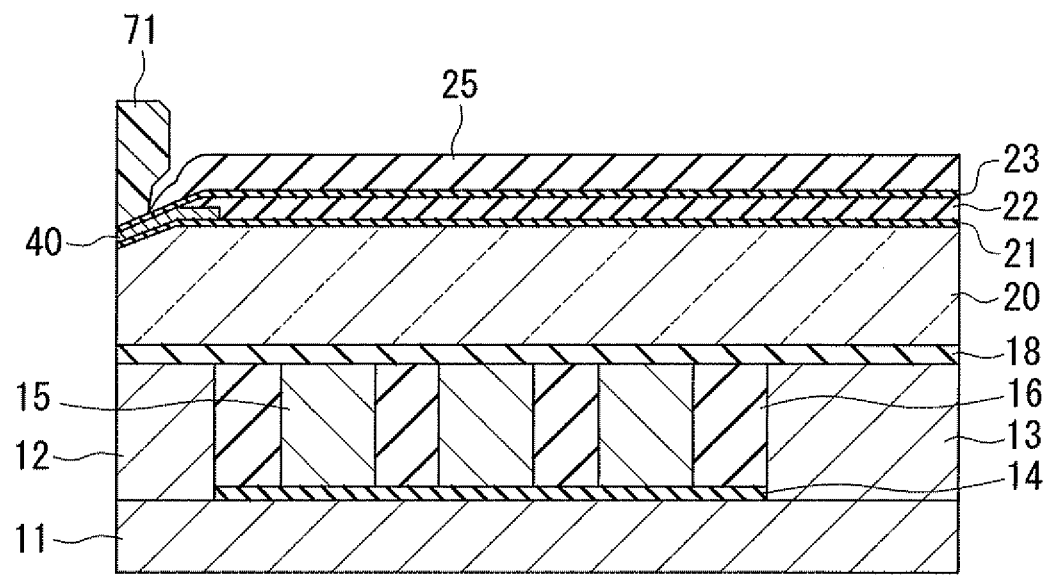
FIG. 12A and FIG. 12B are cross-sectional views showing a step that follows the step shown in FIG. 11A and FIG. 11B.
Figure 12B:
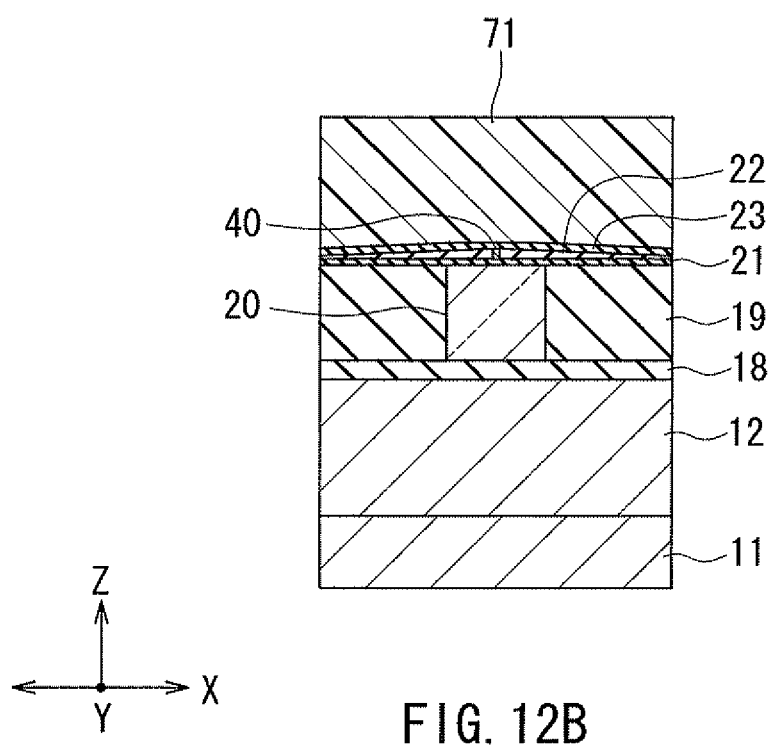

FIG. 12A and FIG. 12B show the next step. In this step, first, a photoresist mask 71 is formed on the dielectric layer 23. The photoresist mask 71 is formed by patterning a photoresist layer by photolithography. The photoresist mask 71 covers a portion of the top surface of the dielectric layer 23 that is to be in contact with the bottom surface 24c of the main pole 24 to be formed later. The photoresist mask 71 is preferably shaped to have an undercut as shown in FIG. 12A so as to be easily removable later. Next, the dielectric layer 25 is formed on the dielectric layer 23. The dielectric layer 25 has a small thickness in the vicinity of the photoresist mask 71. The shapes of the bottom surface 24c and the connecting surface 24e of the main pole 24 are thereby determined. The photoresist mask 71 is then lifted off.

Figure 13A:
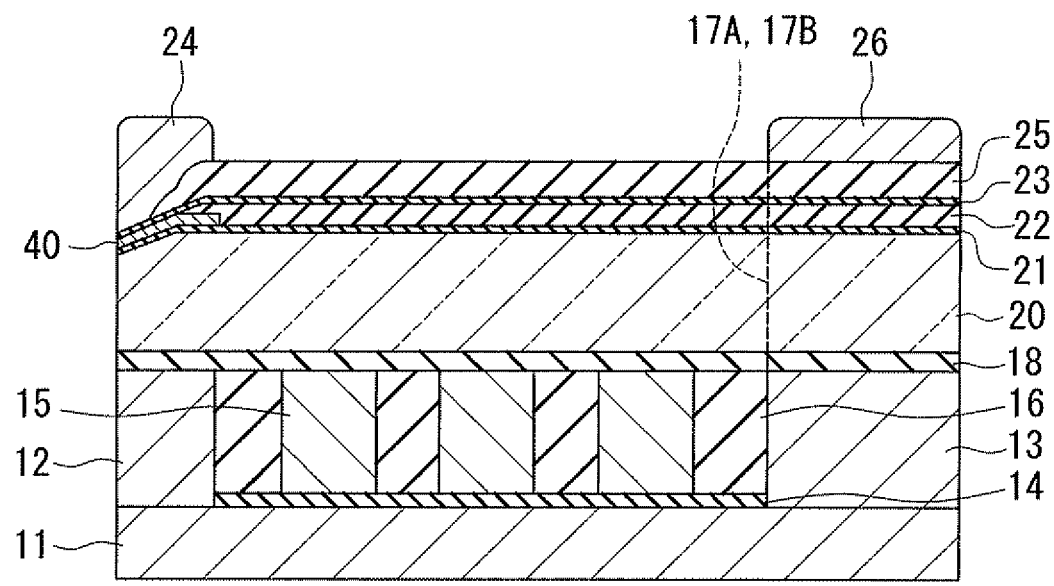
FIG. 13A and FIG. 13B are cross-sectional views showing a step that follows the step shown in FIG. 12A and FIG. 12B.
Figure 13A:
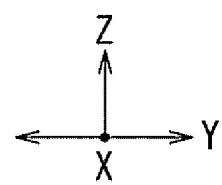
Figure 13B:
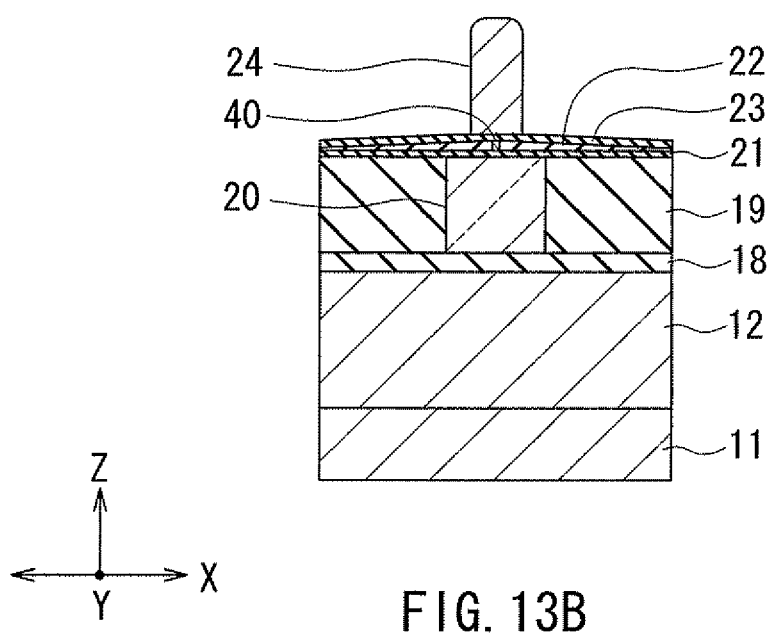
Figure 13B:
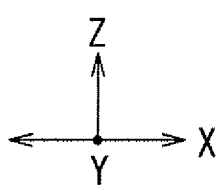

FIG. 13A and FIG. 13B show the next step. In this step, first, the cladding layer 21 and the dielectric layers 22, 23, and 25 are selectively etched to form therein two openings for exposing the top surfaces of the second layers of the coupling portions 17A and 17B. Next, the third layers of the coupling portions 17A and 17B are formed on the second layers of the coupling portions 17A and 17B. Then, the main pole 24 is formed over the dielectric layers 23 and 25, and the coupling layer 26 is formed over the third layers of the coupling portions 17A and 17B and the dielectric layer 25.

Figure 14A:
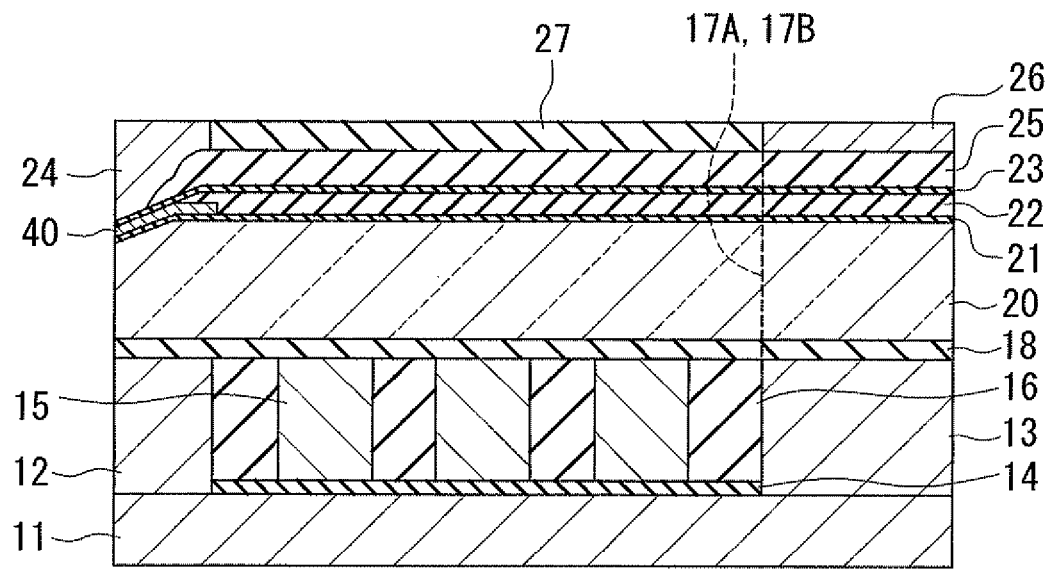
FIG. 14A and FIG. 14B are cross-sectional views showing a step that follows the step shown in FIG. 13A and FIG. 13B.
Figure 14A:
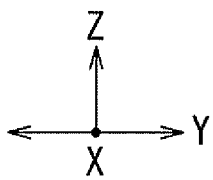
Figure 14B:
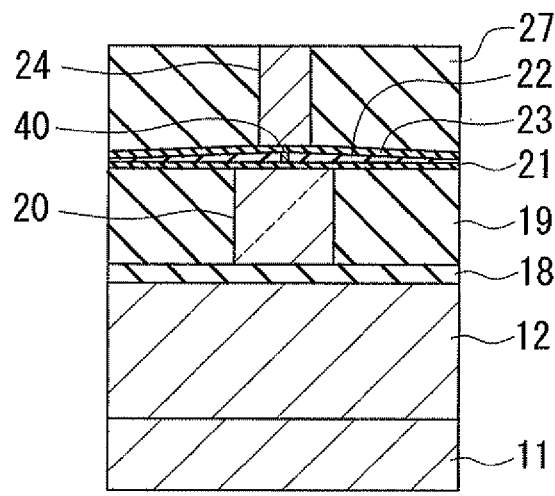
Figure 14B:
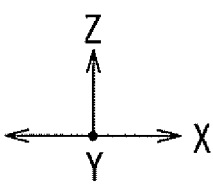

FIG. 14A and FIG. 14B show the next step. In this step, first, the dielectric layer 27 is formed over the entire top surface of the stack. The main pole 24, the coupling layer 26, and the dielectric layer 27 are then polished by, for example, CMP, so that the top surfaces of the main pole 24, the coupling layer 26, and the dielectric layer 27 become even with each other.

Figure 15A:
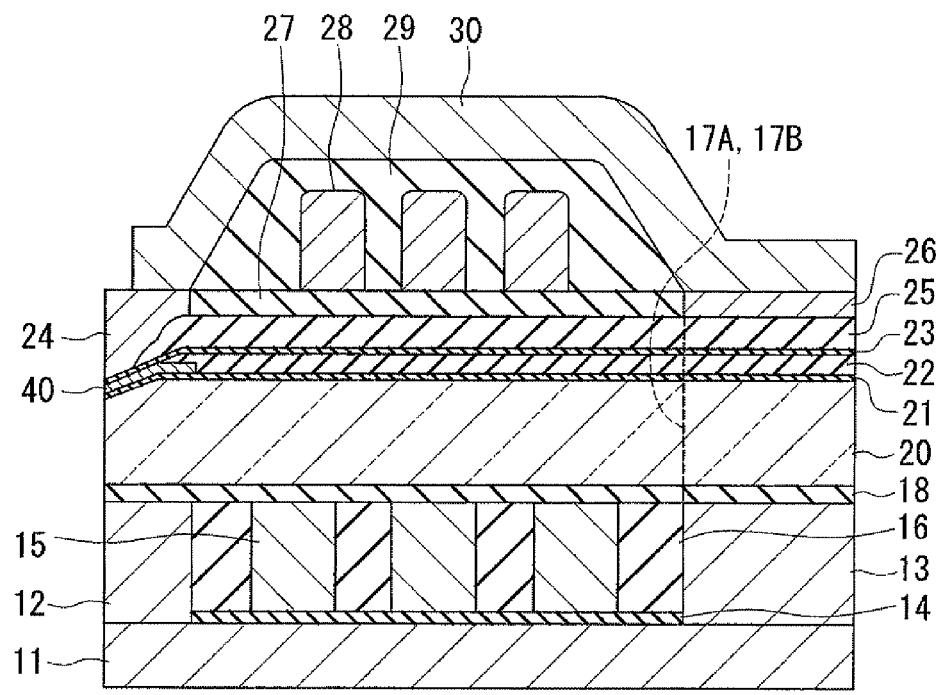
FIG. 15A and FIG. 15B are cross-sectional views showing a step that follows the step shown in FIG. 14A and FIG. 14B.
Figure 15B:
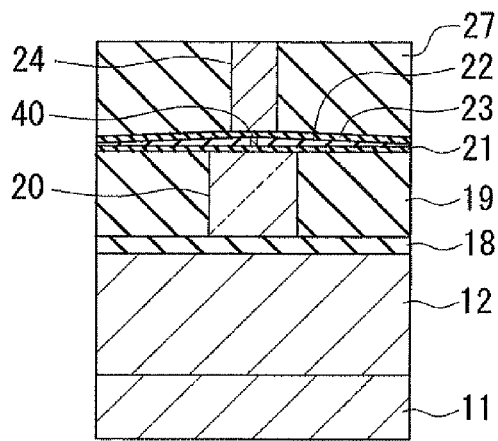

FIG. 15A and FIG. 15B show the next step. In this step, first, the coil 28 is formed on the dielectric layer 27. The insulating layer 29 is then formed to cover the coil 28. Next, the yoke layer 30 is formed over the main pole 24, the coupling layer 26 and the insulating layer 29.

The steps to follow the formation of the yoke layer 30 will now be described with reference to FIG. 3 and FIG. 4. First, the protective layer 31 is formed to cover the yoke layer 30. Wiring, terminals, and other components are then formed on the top surface of the protective layer 31. When the substructure is completed thus, the substructure is cut to separate the plurality of pre-head portions from each other, followed by the polishing of the medium facing surface 60 and the fabrication of flying rails etc. This completes the thermally-assisted magnetic recording head.

Second Embodiment

Figure 16:
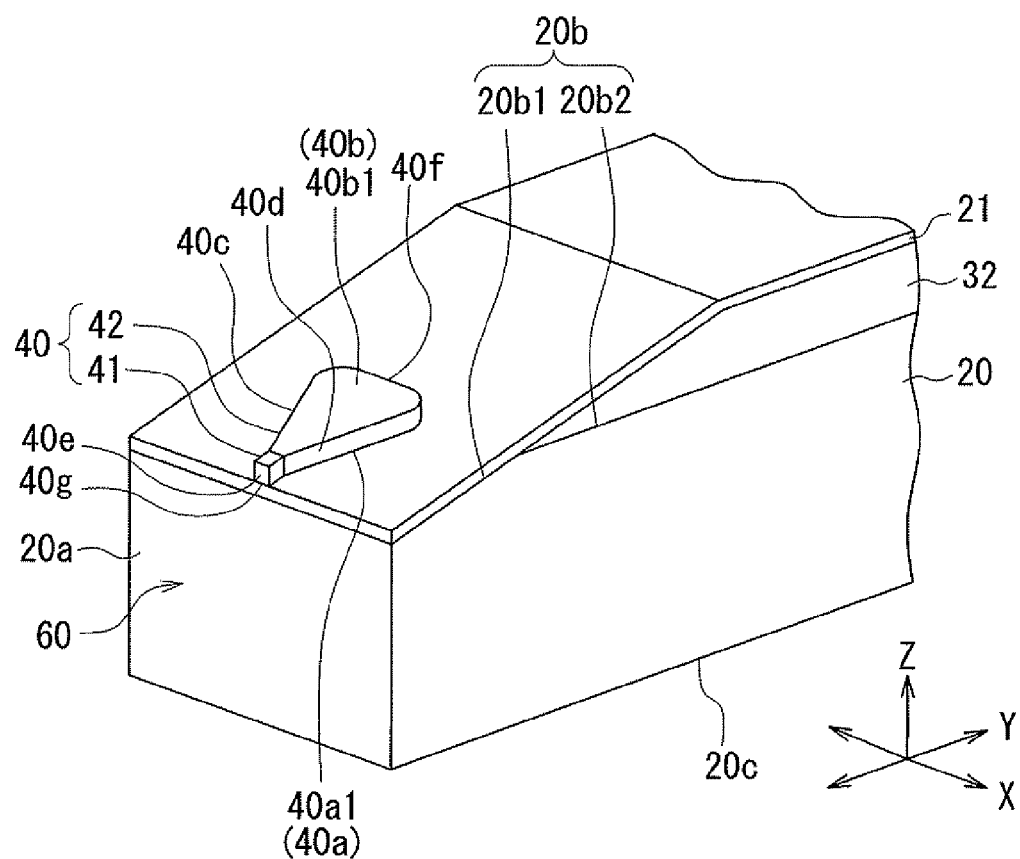
FIG. 16 is a perspective view showing the main part of a thermally-assisted magnetic recording head according to a second embodiment of the invention.
Figure 17:
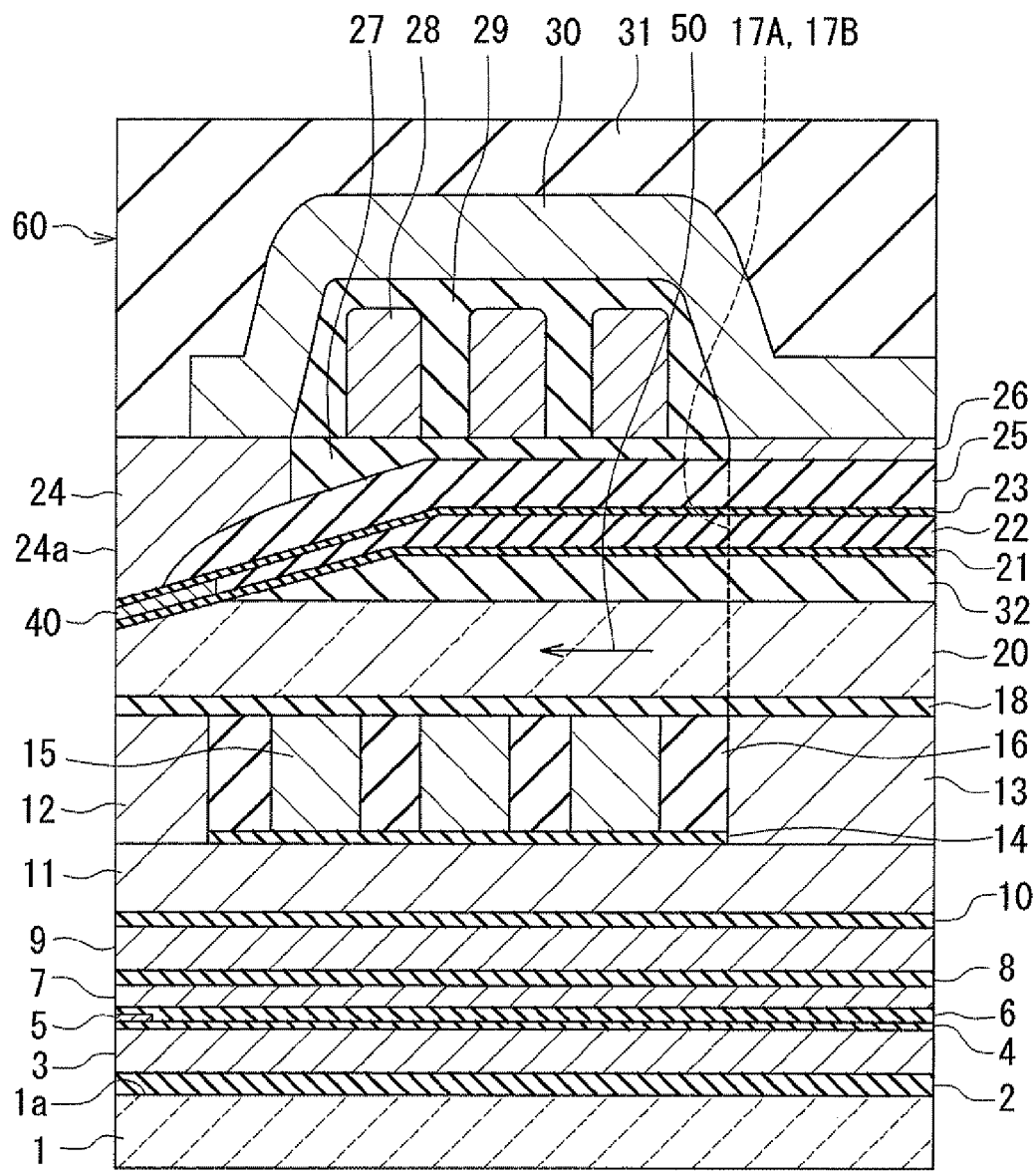
FIG. 17 is a cross-sectional view showing the configuration of the thermally-assisted magnetic recording head according to the second embodiment of the invention.

A thermally-assisted magnetic recording head according to a second embodiment of the invention will now be described. First, reference is made to FIG. 16 and FIG. 17 to describe the differences of the thermally-assisted magnetic recording head according to the present embodiment from the thermally-assisted magnetic recording head according to the first embodiment. FIG. 16 is a perspective view showing the main part of the thermally-assisted magnetic recording head. FIG. 17 is a cross-sectional view showing the configuration of the thermally-assisted magnetic recording head.

The thermally-assisted magnetic recording head according to the present embodiment has a dielectric layer 32 disposed on the horizontal portion 20b2 of the evanescent light generating surface 20b of the core 20. The dielectric layer 32 has a front end face, a top surface, and a bottom surface. The front end face is continuous with the inclined portion 20b1 of the evanescent light generating surface 20b. The cladding layer 21 covers the inclined portion 20b1 of the evanescent light generating surface 20b, and the front end face and the top surface of the dielectric layer 32. The dielectric layer 32 may be made of $SiO_2$ or alumina, for example.

The front end face of the dielectric layer 32 is inclined similarly to the inclined portion 20b1 of the evanescent light generating surface 20b. Specifically, the front end face of the dielectric layer 32 is inclined relative to the virtual straight line L (see FIG. 1) mentioned in the description of the first embodiment such that the distance from the virtual straight line L decreases with increasing proximity to the medium facing surface 60. The angle that the front end face of the dielectric layer 32 forms relative to the virtual straight line L may be equal to the angle θ1 (see FIG. 1) that the inclined portion 20b1 of the evanescent light generating surface 20b forms relative to the virtual straight line L.

Further, in the thermally-assisted magnetic recording head according to the present embodiment, the plasmon exciting part 40a of the plasmon generator 40 includes only the inclined portion 40a1 and does not include the horizontal portion 40a2. Consequently, in the present embodiment, the entire plasmon exciting part 40a is inclined relative to the virtual straight line L such that the distance from the virtual straight line L decreases with increasing proximity to the medium facing surface 60. The top surface 40b of the plasmon generator 40 also includes only the inclined portion 40b1 and does not include the horizontal portion 40b2.

Now, a method of manufacturing the thermally-assisted magnetic recording head according to the present embodiment will be described with reference to FIG. 18A through FIG. 24B. FIG. 18A through FIG. 24B are cross-sectional views each showing part of a stack of layers formed in the process of manufacturing the thermally-assisted magnetic recording head. Note that portions located below the return pole layer 11 are omitted from FIG. 18A through FIG. 24B. FIG. 18A to FIG. 24A each show a cross section that intersects the front end face 24a of the main pole 24 and that is perpendicular to the medium facing surface 60 and the top surface 1a of the substrate 1. FIG. 18B to FIG. 24B each show a cross section of the stack taken in the position at which the medium facing surface 60 is to be formed.

Figure 18A:
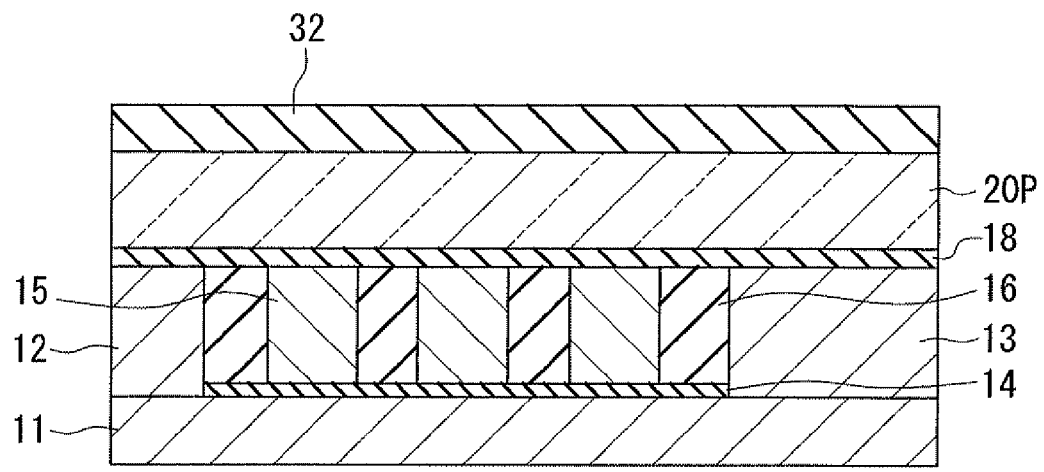
FIG. 18A and FIG. 18B are cross-sectional views showing a step of a method of manufacturing the thermally-assisted magnetic recording head according to the second embodiment of the invention.
Figure 18B:
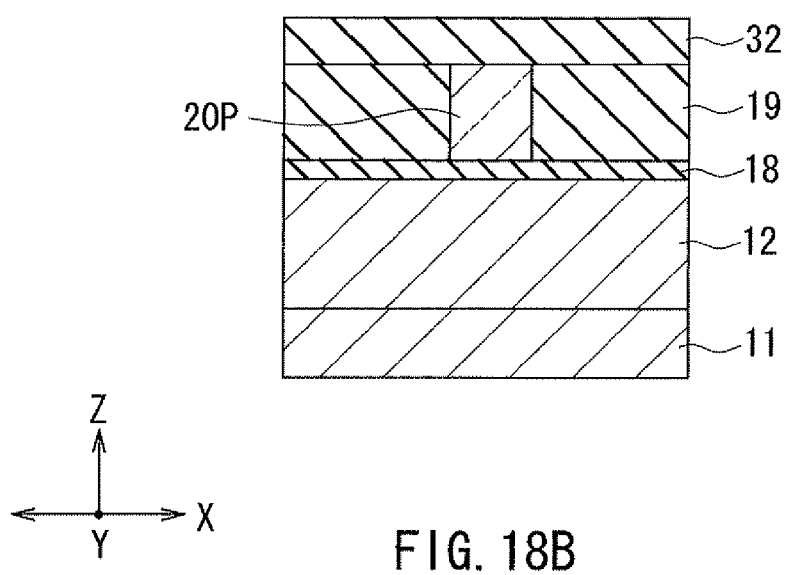

The method of manufacturing the thermally-assisted magnetic recording head according to the present embodiment is the same as the method according to the first embodiment up to the step of polishing the cladding layer 19. FIG. 18A and FIG. 18B show a step that follows the polishing of the cladding layer 19. In this step, the dielectric layer 32 is formed over the entire top surface of the stack.

Figure 19A:
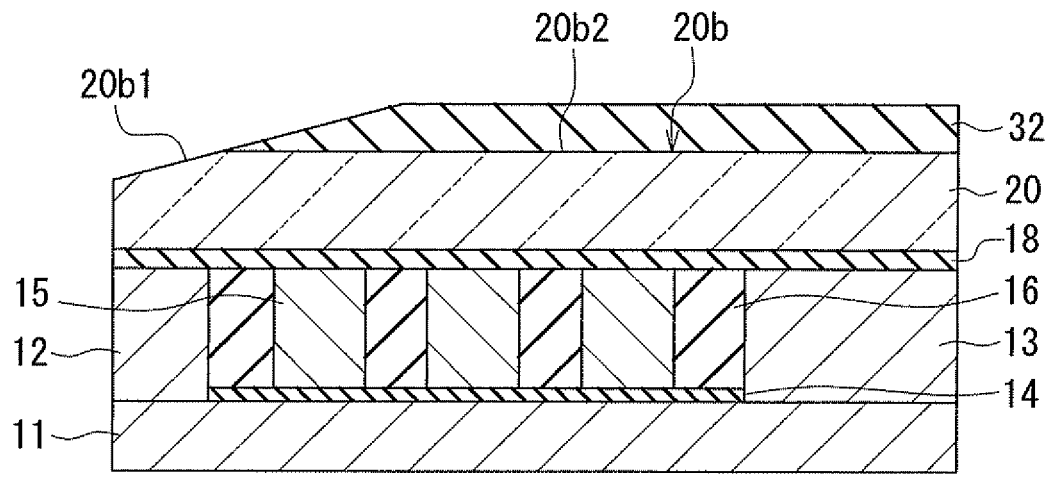
FIG. 19A and FIG. 19B are cross-sectional views showing a step that follows the step shown in FIG. 18A and FIG. 18B.
Figure 19B:
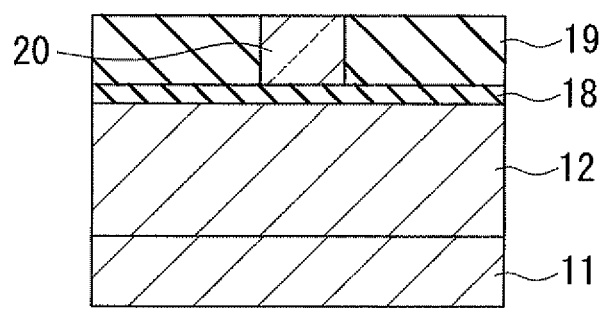

FIG. 19A and FIG. 19B show the next step. In this step, portions of the dielectric layers 20P and 32 and the cladding layer 19 are taper-etched by, for example, IBE, so that the dielectric layer 20P is provided with the inclined portion 20b1 and the dielectric layer 32 is provided with the front end face mentioned above. The dielectric layer 20P is thereby made into the core 20.

Figure 20A:
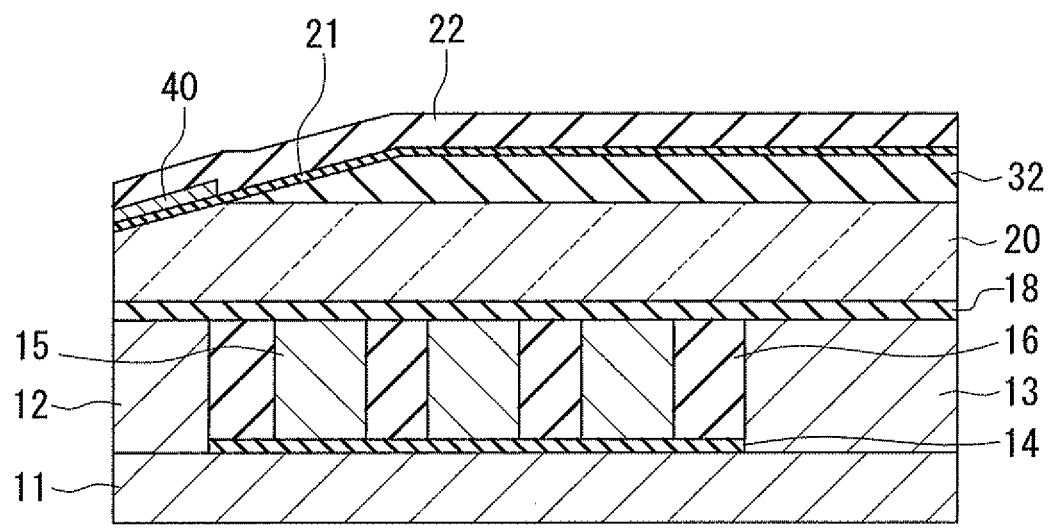
FIG. 20A and FIG. 20B are cross-sectional views showing a step that follows the step shown in FIG. 19A and FIG. 19B.
Figure 20A:
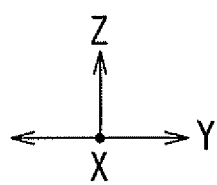
Figure 20B:
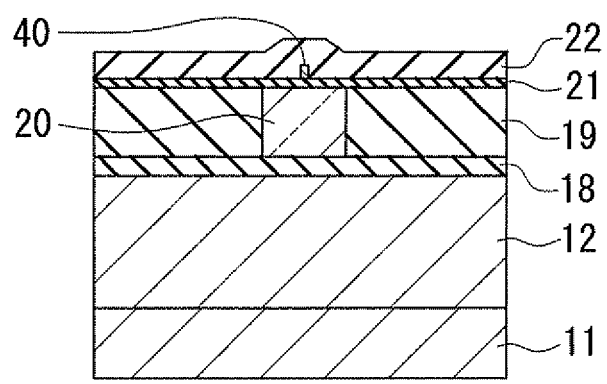
Figure 20B:
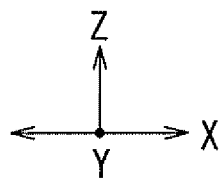
Figure 21A:
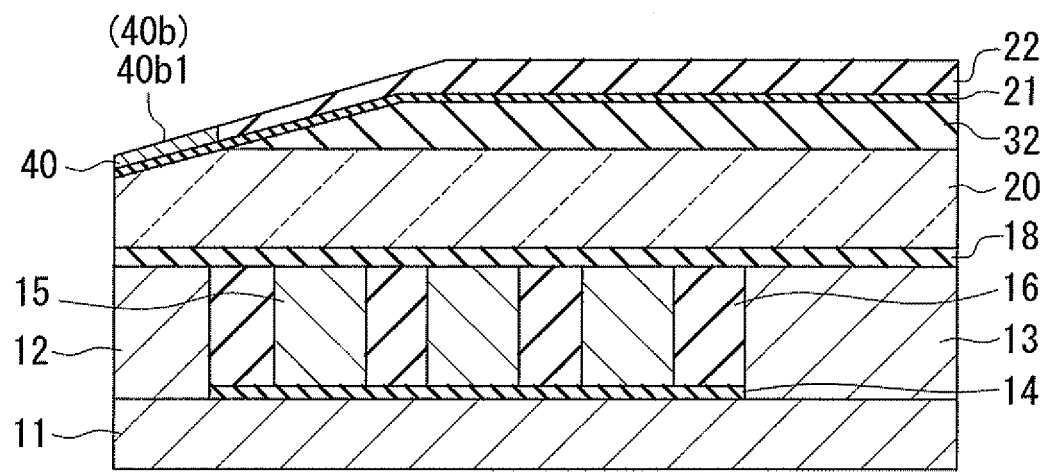
FIG. 21A and FIG. 21B are cross-sectional views showing a step that follows the step shown in FIG. 20A and FIG. 20B.
Figure 21B:
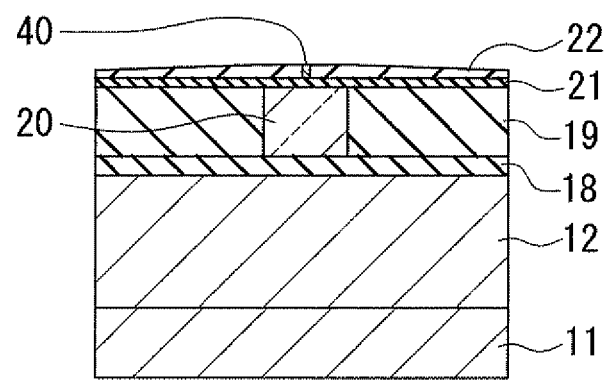
Figure 22A:
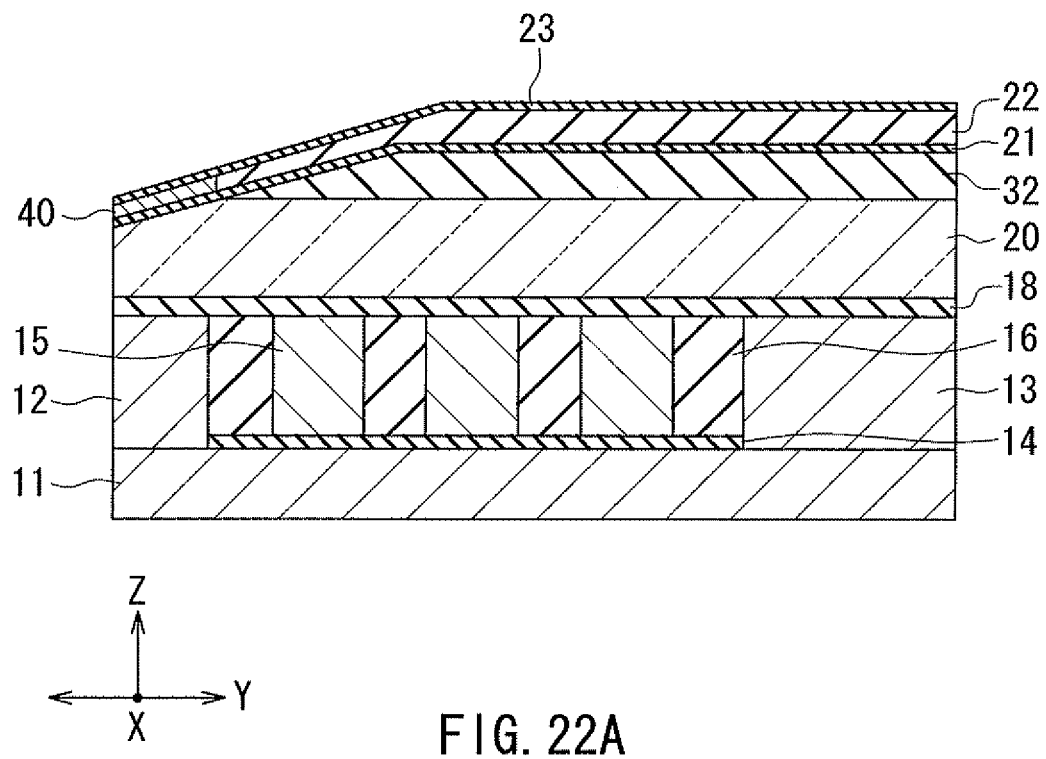
FIG. 22A and FIG. 22B are cross-sectional views showing a step that follows the step shown in FIG. 21A and FIG. 21B.
Figure 22B:
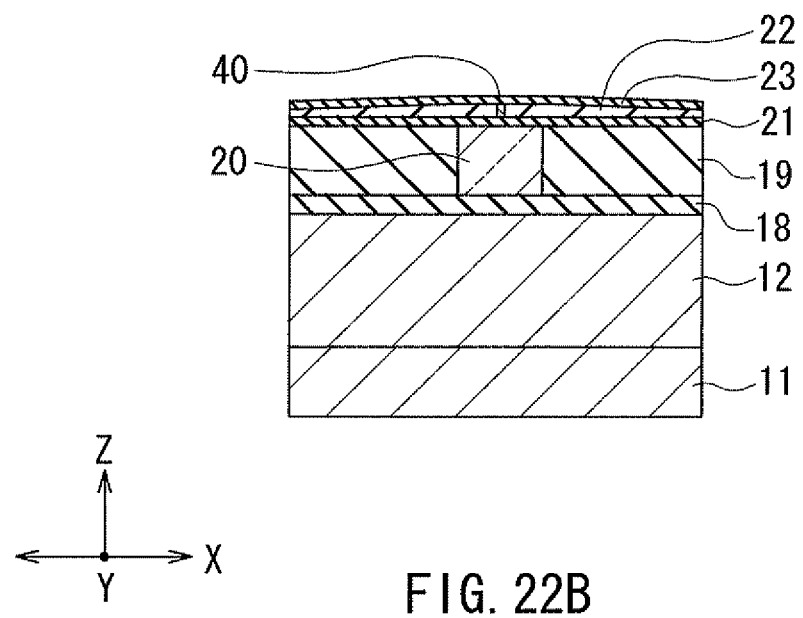

FIG. 20A and FIG. 20B show the next step. In this step, first, the cladding layer 21 is formed over the entire top surface of the stack. The plasmon generator 40 is then formed on the cladding layer 21. Next, the dielectric layer 22 is formed over the entire top surface of the stack. Then, part of the dielectric layer 22 is etched by, for example, IBE, so that the top surface 40b (the inclined portion 40b1) of the plasmon generator 40 is exposed as shown in FIG. 21A and FIG. 21B. Next, the dielectric layer 23 is formed over the entire top surface of the stack as shown in FIG. 22A and FIG. 22B.

Figure 23A:
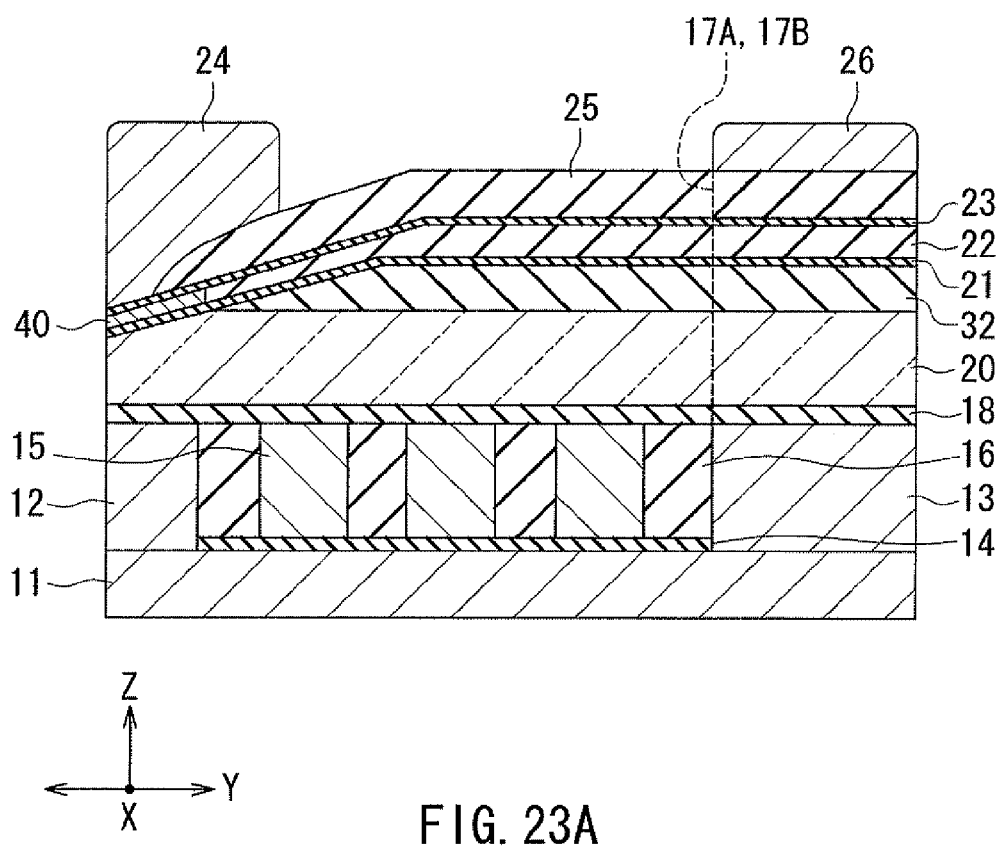
FIG. 23A and FIG. 23B are cross-sectional views showing a step that follows the step shown in FIG. 22A and FIG. 22B.
Figure 23B:
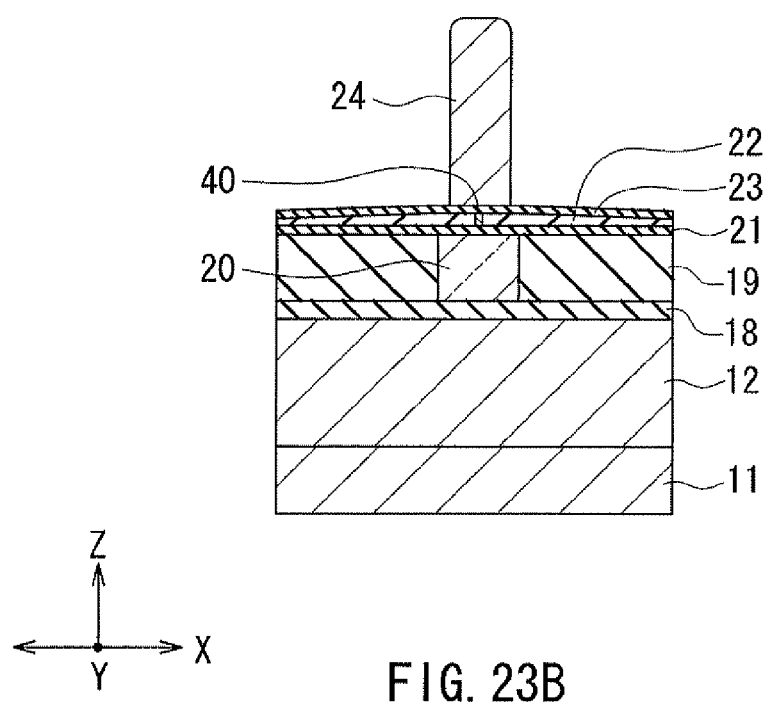

FIG. 23A and FIG. 23B show the next step. This step forms the dielectric layer 25, the third layers of the coupling portions 17A and 17B, the main pole 24, and the coupling layer 26 in this order in the same manner as in the first embodiment.

Figure 24A:
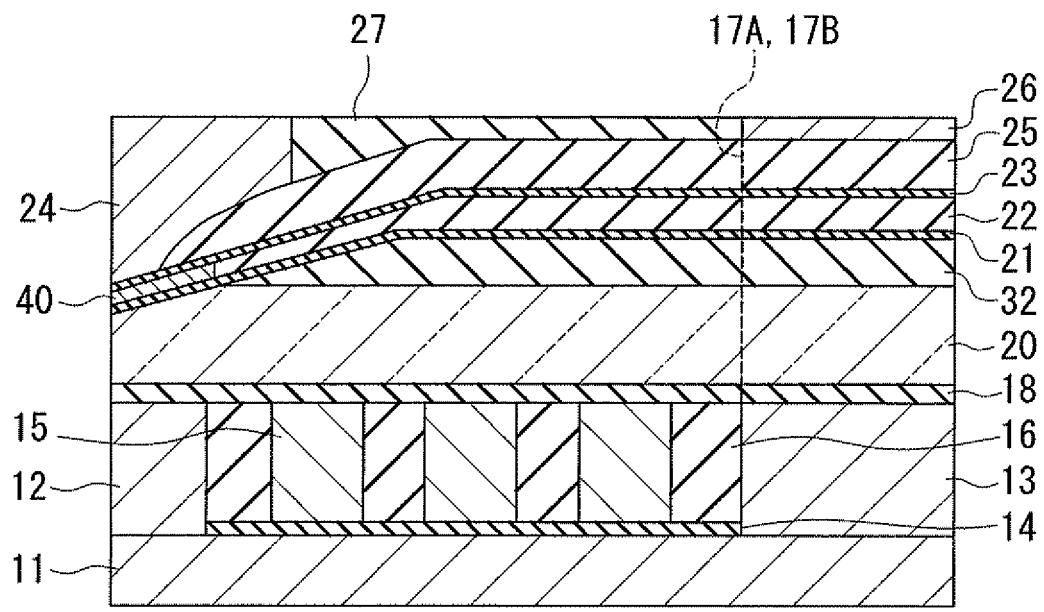
FIG. 24A and FIG. 24B are cross-sectional views showing a step that follows the step shown in FIG. 23A and FIG. 23B.
Figure 24B:
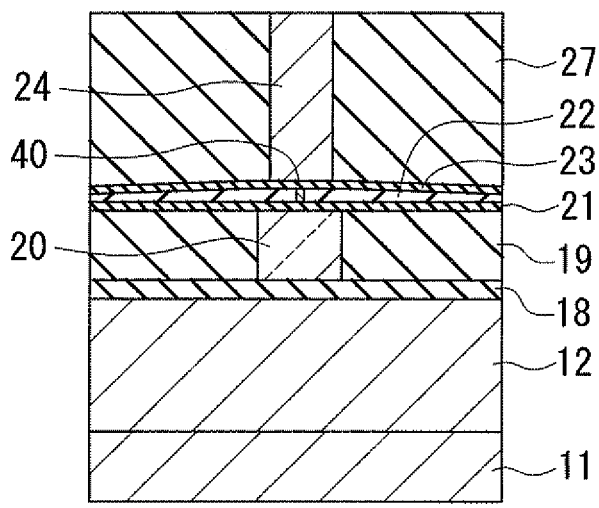

FIG. 24A and FIG. 24B show the next step. In this step, first, the dielectric layer 27 is formed over the entire top surface of the stack. The main pole 24, the coupling layer 26, and the dielectric layer 27 are then polished by, for example, CMP, so that the top surfaces of the main pole 24, the coupling layer 26, and the dielectric layer 27 become even with each other. The subsequent steps are the same as in the first embodiment.

The remainder of configuration, function and effects of the present embodiment are similar to those of the first embodiment.

Third Embodiment

Figure 25:
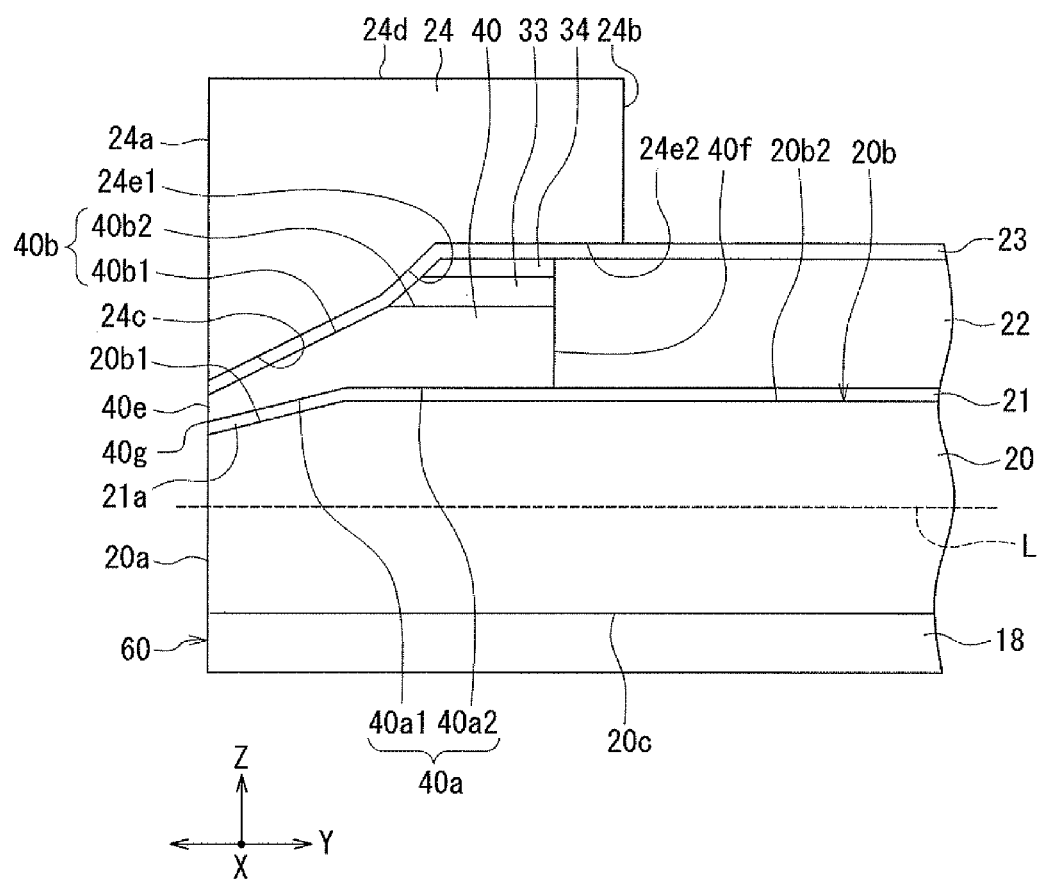
FIG. 25 is a cross-sectional view showing the main part of a thermally-assisted magnetic recording head according to a third embodiment of the invention.

A thermally-assisted magnetic recording head according to a third embodiment of the invention will now be described. First, reference is made to FIG. 25 to describe the differences of the thermally-assisted magnetic recording head according to the present embodiment from the thermally-assisted magnetic recording head according to the first embodiment. FIG. 25 is a cross-sectional view showing the main part of the thermally-assisted magnetic recording head.

In the thermally-assisted magnetic recording head according to the present embodiment, the inclined portion 40b1 of the top surface 40b of the plasmon generator 40 forms a greater angle relative to the virtual straight line L than the angle formed by the inclined portion 40a1 of the plasmon exciting part 40a relative to the virtual straight line L. Further, the thickness (the dimension in the Z direction) of the plasmon generator 40 gradually increases with increasing distance from the medium facing surface 60, and then becomes constant.

The thermally-assisted magnetic recording head according to the present embodiment includes a nonmagnetic metal layer 33 made of a nonmagnetic metal material and disposed on the horizontal portion 40b2 of the top surface 40b of the plasmon generator 40, and an insulating layer 34 made of an insulating material and disposed on the top surface of the nonmagnetic metal layer 33. The dielectric layer 23 is disposed to cover the plasmon generator 40, the nonmagnetic metal layer 33, the insulating layer 34, and the dielectric layer 22. The nonmagnetic metal layer 33 is made of, for example, Ru, NiCr, or NiCu. The insulating layer 34 is made of alumina, for example.

In the thermally-assisted magnetic recording head according to the present embodiment, the main pole 24 has a first connecting surface 24e1 and a second connecting surface 24e2 in place of the connecting surface 24e mentioned in the description of the first embodiment. In the main pole 24, an end of the first connecting surface 24e1 is connected to the bottom surface 24c, the other end of the first connecting surface 24e1 is connected to an end of the second connecting surface 24e2, and the other end of the second connecting surface 24e2 is connected to the rear end face 24b. The distance from the top surface 1a of the substrate 1 to an arbitrary point on the first connecting surface 24e1 increases with increasing distance from the arbitrary point to the medium facing surface 60. The distance between the first connecting surface 24e1 and the evanescent light generating surface 20b of the core 20 increases with increasing distance from the medium facing surface 60. This makes it possible to prevent the light propagating through the core 20 from being absorbed in part by the main pole 24 and to prevent the surface plasmons excited on the plasmon exciting part 40a from being absorbed in part by the main pole 24. The second connecting surface 24e2 extends substantially perpendicularly to the medium facing surface 60.

The effects of the thermally-assisted magnetic recording head according to the present embodiment will now be described. As the plasmon generator 40 is reduced in thickness (dimension in the Z direction), the excitation efficiency of surface plasmons is decreased to cause less surface plasmons to be excited. For this reason, the plasmon generator 40 preferably has a thickness of a certain magnitude. In the present embodiment, part of the plasmon generator 40 gradually increases in thickness (dimension in the Z direction) with increasing distance from the medium facing surface 60. According to the present embodiment, this allows the front end face 40e to be small in dimension in the Z direction while allowing the plasmon generator 40 to be large in thickness in the part thereof away from the medium facing surface 60. Consequently, according to the present embodiment, it is possible to produce near-field light having a small spot diameter and sufficient intensity.

Figure 26:
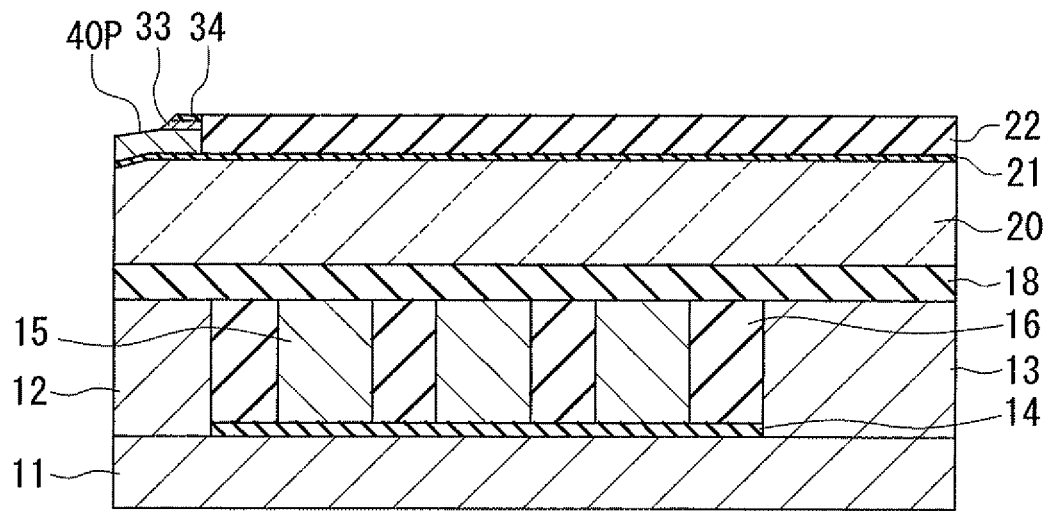
FIG. 26 is a cross-sectional view showing a step of a method of manufacturing the thermally-assisted magnetic recording head according to the third embodiment of the invention.
Figure 27:
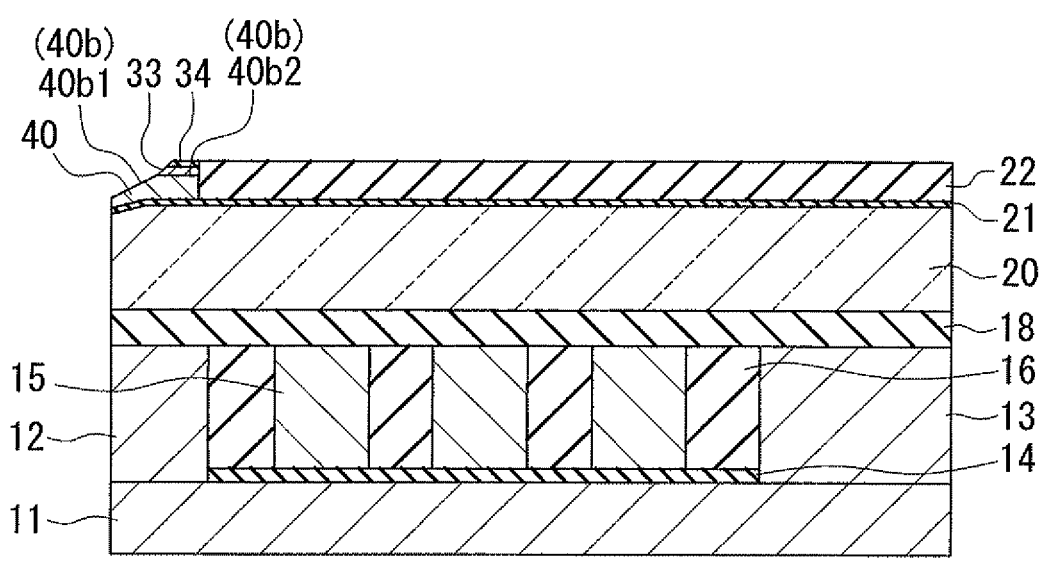
FIG. 27 is a cross-sectional view showing a step that follows the step shown in FIG. 26.

Now, a method of manufacturing the thermally-assisted magnetic recording head of the present embodiment will be described briefly with reference to FIG. 26 and FIG. 27. FIG. 26 and FIG. 27 are cross-sectional views each showing part of a stack of layers formed in the process of manufacturing the thermally-assisted magnetic recording head. Note that portions located below the return pole layer 11 are omitted from FIG. 26 and FIG. 27. FIG. 26 and FIG. 27 each show a cross section that intersects the front end face of the main pole 24 and that is perpendicular to the medium facing surface 60 and the top surface 1a of the substrate 1.

The method of manufacturing the thermally-assisted magnetic recording head according to the present embodiment is the same as the method according to the first embodiment up to the step of forming the cladding layer 21. FIG. 26 shows a step that follows the formation of the cladding layer 21. In this step, first, a metal film 40P, which is to later become the plasmon generator 40, is formed on the cladding layer 21. The nonmagnetic metal layer 33 and the insulating layer 34 are then formed in this order on the metal film 40P. Next, the metal film 40P, the nonmagnetic metal layer 33 and the insulating layer 34 are selectively etched in their respective portions located away from the position at which the medium facing surface 60 is to be formed. A portion of the top surface of the metal film 40P thus etched, the portion being covered with the nonmagnetic metal layer 33, is to later become the horizontal portion 40b2 of the top surface 40b of the plasmon generator 40. The dielectric layer 22 is then formed around the metal film 40P, the nonmagnetic metal layer 33 and the insulating layer 34.

FIG. 27 shows the next step. In this step, the metal film 40P is etched by, for example, IBE using the nonmagnetic metal layer 33 and the insulating layer 34 as etching masks, so that the metal film 40P is provided with the inclined portion 40b1 of the top surface 40b. The metal film 40P is thereby made into the plasmon generator 40. The subsequent steps are the same as in the first embodiment.

The remainder of configuration, function and effects of the present embodiment are similar to those of the first embodiment.

Fourth Embodiment

Figure 28:
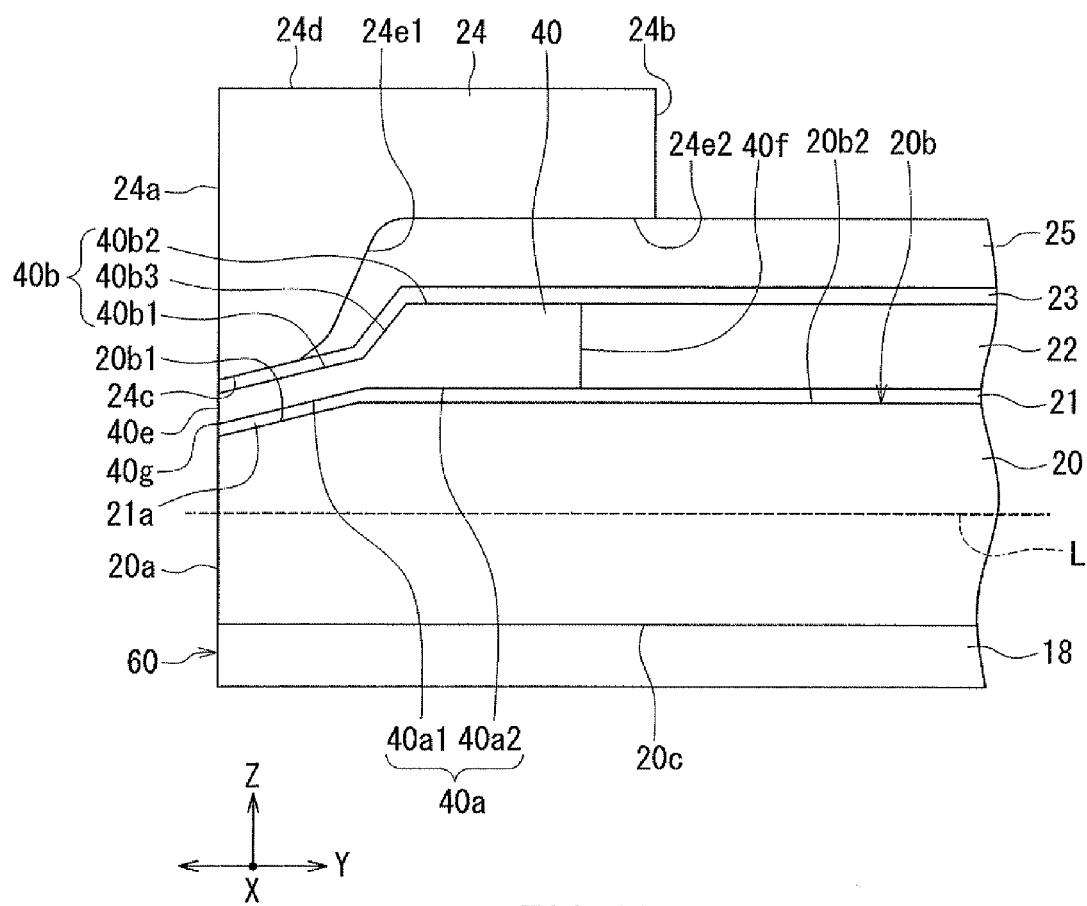
FIG. 28 is a cross-sectional view showing the main part of a thermally-assisted magnetic recording head according to a fourth embodiment of the invention.

A thermally-assisted magnetic recording head according to a fourth embodiment of the invention will now be described with reference to FIG. 28. FIG. 28 is a cross-sectional view showing the main part of the thermally-assisted magnetic recording head. The thermally-assisted magnetic recording head according to the present embodiment is different from the thermally-assisted magnetic recording head according to the first embodiment in the following respects. In the thermally-assisted magnetic recording head according to the present embodiment, the top surface 40b of the plasmon generator 40 includes a connecting portion 40b3 in addition to the inclined portion 40b1 and the horizontal portion 40b2. The connecting portion 40b3 has a front end portion connected to the inclined portion 40b1 and a rear end portion opposite to the front end portion. In the present embodiment, the horizontal portion 40b2 is connected to the rear end portion of the connecting portion 40b3.

The connecting portion 40b3 is inclined relative to the virtual straight line L such that the distance from the virtual straight line L decreases with increasing proximity to the medium facing surface 60. The connecting portion 40b3 forms a greater angle relative to the virtual straight line L than the angle formed by the inclined portion 40b1 relative to the virtual straight line L. Further, in the vicinity of the medium facing surface 60, the thickness (the dimension in the Z direction) of the plasmon generator 40 is generally constant regardless of the distance from the medium facing surface 60, whereas in the positions away from the medium facing surface 60, the thickness of plasmon generator 40 gradually increases with increasing distance from the medium facing surface 60 and then becomes constant.

FIG. 28 shows an example in which the connecting portion 40b3 is located above the horizontal portion 40a2 of the plasmon exciting part 40a. However, the connecting portion 40b3 may be located above the inclined portion 40a1 of the plasmon exciting part 40a. In this case, the top surface 40b may include a second inclined portion inclined relative to the virtual straight line L, in place of the horizontal portion 40b2. The second inclined portion may form the same angle relative to the virtual straight line L as the angle formed by the inclined portion 40a1 of the plasmon exciting part 40a relative to the virtual straight line L. In this case, the plasmon exciting part 40a need not necessarily include the horizontal portion 40a2.

In the thermally-assisted magnetic recording head according to the present embodiment, the main pole 24 has the first connecting surface 24e1 and the second connecting surface 24e2 mentioned in the description of the third embodiment, in place of the connecting surface 24e mentioned in the description of the first embodiment.

The remainder of configuration, function and effects of the present embodiment are similar to those of the first or third embodiment.

The present invention is not limited to the foregoing embodiments, and various modifications may be made thereto. For example, as far as the requirements of the appended claims are met, the shapes and locations of the core of the waveguide, the plasmon generator, and the main pole can be chosen as desired, without being limited to the examples illustrated in the foregoing embodiments.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:
1. A thermally-assisted magnetic recording head comprising:
   a medium facing surface that faces a recording medium;
   a main pole that has an end face located in the medium facing surface and produces a write magnetic field for writing data on the recording medium;

a waveguide including a core through which light propagates, and a cladding that surrounds the core; and a plasmon generator having a near-field light generating part located in the medium facing surface, wherein:

the core has an evanescent light generating surface that generates evanescent light based on the light propagating through the core;

the plasmon generator has a plasmon exciting part that is opposed to the evanescent light generating surface with a predetermined distance therebetween;

the cladding includes an interposer interposed between the evanescent light generating surface and the plasmon exciting part;

assuming a virtual straight line that passes internally through the core and that is parallel to a direction of travel of the light propagating through the core, at least part of the evanescent light generating surface and at least part of the plasmon exciting part are both inclined relative to the virtual straight line such that a distance from the virtual straight line decreases with increasing proximity to the medium facing surface; and the plasmon generator is configured so that a surface plasmon is excited on the plasmon exciting part through coupling with the evanescent light generated from the evanescent light generating surface, the surface plasmon propagates to the near-field light generating part, and the near-field light generating part generates near-field light based on the surface plasmon.

2. The thermally-assisted magnetic recording head according to claim 1, wherein the at least part of the evanescent light generating surface and the at least part of the plasmon exciting part each forms an angle in the range of 10° to 35° relative to the virtual straight line.

3. The thermally-assisted magnetic recording head according to claim 1, wherein the at least part of the evanescent light generating surface and the at least part of the plasmon exciting part each forms an angle in the range of 10° to 20° relative to the virtual straight line.

4. The thermally-assisted magnetic recording head according to claim 1, wherein the plasmon exciting part is a surface.

5. The thermally-assisted magnetic recording head according to claim 4, wherein:

The plasmon exciting part includes a width changing portion; and

The width changing portion has a width in a direction parallel to the medium facing surface and the evanescent light generation surface, the width decreasing with increasing proximity to the medium facing surface.

6. The thermally-assisted magnetic recording head according to claim 1, wherein the plasmon generator is interposed between the core and the main pole.

* * * * *